US 8,255,828 B2

(12) United States Patent
Harris et al.

(10) Patent No.: US 8,255,828 B2
(45) Date of Patent: Aug. 28, 2012

(54) COMMAND USER INTERFACE FOR DISPLAYING SELECTABLE SOFTWARE FUNCTIONALITY CONTROLS

(75) Inventors: Jensen M. Harris, Kirkland, WA (US); Aaron M. Butcher, Duvall, WA (US); David A. Morton, Redmond, WA (US); Jesse Clay Satterfield, Seattle, WA (US); Justin Denney, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 675 days.

(21) Appl. No.: 10/955,967

(22) Filed: Sep. 30, 2004

(65) Prior Publication Data
US 2006/0036965 A1    Feb. 16, 2006

Related U.S. Application Data

(60) Provisional application No. 60/601,815, filed on Aug. 16, 2004.

(51) Int. Cl.
  *G06F 3/048* (2006.01)
(52) U.S. Cl. ........ 715/810; 715/711; 715/800; 715/802; 715/825; 715/828; 715/841; 715/842; 715/843
(58) Field of Classification Search .................. 715/841, 715/843, 845, 530, 711, 724, 810, 800, 802, 715/825, 828, 842
  See application file for complete search history.

(56) References Cited

U.S. PATENT DOCUMENTS

| | | | |
|---|---|---|---|
| 4,823,283 A * | 4/1989 | Diehm et al. .................. 715/825 |
| 5,155,806 A | 10/1992 | Hoeber et al. ................. 715/711 |
| 5,220,675 A | 6/1993 | Padawer et al. | |
| 5,247,438 A | 9/1993 | Subas et al. ..................... 700/90 |
| 5,323,314 A | 6/1994 | Baber et al. ........................ 705/8 |
| 5,377,354 A | 12/1994 | Scannell et al. ............... 718/103 |
| 5,412,772 A | 5/1995 | Monson | |
| 5,461,708 A | 10/1995 | Kahn | |
| 5,475,805 A | 12/1995 | Murata .......................... 715/513 |
| 5,500,936 A | 3/1996 | Allen et al. ..................... 395/156 |
| 5,519,606 A | 5/1996 | Frid-Nielsen et al. ............. 705/9 |
| 5,559,875 A | 9/1996 | Bieselin et al. .......... 379/202.01 |
| 5,559,944 A | 9/1996 | Ono ................................ 715/841 |
| 5,570,109 A | 10/1996 | Jenson .......................... 715/823 |
| 5,581,677 A | 12/1996 | Myers et al. | |
| 5,588,107 A | 12/1996 | Bowden et al. ............... 715/828 |

(Continued)

FOREIGN PATENT DOCUMENTS

AU    2005203411    3/2006

(Continued)

OTHER PUBLICATIONS

Screendumps (Microsoft Corporation, Microsoft Office Professional Edition 2003; 4 pages).*

(Continued)

*Primary Examiner* — Steven Sax
*Assistant Examiner* — Linh K Pham
(74) *Attorney, Agent, or Firm* — Merchant & Gould

(57) ABSTRACT

An improved user interface is provided for displaying selectable software functionality controls and for presenting logical groupings of particular functionality controls associated with a selected top-level functionality. Underneath a row of top-level functionality tabs, functionalities controls associated with a given top-level functionality tab are presented in logical groupings. Selection of a particular tab switches modes of the user interface to present controls for functionalities associated with the selected tab.

33 Claims, 8 Drawing Sheets

U.S. PATENT DOCUMENTS

| | | | |
|---|---|---|---|
| 5,592,602 A | 1/1997 | Edmunds | |
| 5,596,694 A | 1/1997 | Capps | 345/473 |
| 5,625,783 A | 4/1997 | Ezekiel et al. | 395/352 |
| 5,634,100 A | 5/1997 | Capps | 705/9 |
| 5,634,128 A | 5/1997 | Messina | 710/200 |
| 5,638,504 A | 6/1997 | Scott et al. | 715/202 |
| 5,644,737 A * | 7/1997 | Tuniman et al. | 715/810 |
| 5,659,693 A | 8/1997 | Hansen et al. | 715/779 |
| 5,664,127 A | 9/1997 | Anderson et al. | 715/209 |
| 5,664,208 A | 9/1997 | Pavley et al. | 715/209 |
| 5,673,403 A | 9/1997 | Brown et al. | 715/744 |
| 5,721,847 A | 2/1998 | Johnson | 395/333 |
| 5,734,915 A | 3/1998 | Roewer | 395/773 |
| 5,760,768 A | 6/1998 | Gram | 345/333 |
| 5,760,773 A | 6/1998 | Berman et al. | 715/808 |
| 5,761,646 A | 6/1998 | Frid-Nielsen et al. | 705/9 |
| 5,764,960 A | 6/1998 | Perks et al. | |
| 5,778,402 A | 7/1998 | Gipson | 715/201 |
| 5,778,404 A | 7/1998 | Capps et al. | 715/531 |
| 5,787,295 A | 7/1998 | Nakao | 715/210 |
| 5,793,365 A | 8/1998 | Tang et al. | 715/758 |
| 5,805,167 A | 9/1998 | Van Cruyningen | 715/808 |
| 5,812,132 A | 9/1998 | Goldstein | 715/797 |
| 5,821,936 A * | 10/1998 | Shaffer et al. | 715/810 |
| 5,828,376 A * | 10/1998 | Solimene et al. | 715/821 |
| 5,838,321 A | 11/1998 | Wolf | 345/343 |
| 5,842,009 A | 11/1998 | Borovoy et al. | 707/1 |
| 5,844,558 A | 12/1998 | Kumar et al. | 345/339 |
| 5,844,572 A | 12/1998 | Schott | 345/440 |
| 5,855,006 A | 12/1998 | Huemoeller et al. | 705/9 |
| 5,864,848 A | 1/1999 | Horvitz et al. | |
| 5,872,973 A | 2/1999 | Mitchell et al. | |
| 5,873,108 A | 2/1999 | Goyal et al. | 715/203 |
| 5,874,956 A | 2/1999 | LaHood | |
| 5,885,006 A | 3/1999 | Sheedy | 384/192 |
| 5,893,073 A | 4/1999 | Kasso et al. | 705/8 |
| 5,893,125 A | 4/1999 | Shostak | 715/206 |
| 5,895,476 A | 4/1999 | Orr et al. | 715/202 |
| 5,898,436 A | 4/1999 | Stewart et al. | 345/354 |
| 5,899,979 A | 5/1999 | Miller et al. | 705/9 |
| 5,903,902 A | 5/1999 | Orr et al. | 715/517 |
| 5,905,863 A | 5/1999 | Knowles et al. | 709/206 |
| 5,926,806 A | 7/1999 | Marshall et al. | 707/3 |
| 5,936,625 A | 8/1999 | Kahl et al. | 715/775 |
| 5,937,160 A | 8/1999 | Davis et al. | 709/203 |
| 5,940,078 A | 8/1999 | Nagarajayya et al. | 345/346 |
| 5,940,847 A | 8/1999 | Fein et al. | 707/540 |
| 5,943,051 A | 8/1999 | Onda et al. | 715/786 |
| 5,956,737 A | 9/1999 | King et al. | 715/511 |
| 5,960,406 A | 9/1999 | Rasansky et al. | 705/9 |
| 5,970,466 A | 10/1999 | Detjen et al. | 705/8 |
| 5,999,173 A | 12/1999 | Ubillos | |
| 5,999,938 A | 12/1999 | Bliss et al. | 707/102 |
| 6,008,806 A | 12/1999 | Nakajima et al. | 345/335 |
| 6,012,075 A | 1/2000 | Fein et al. | 707/540 |
| 6,016,478 A | 1/2000 | Zhang et al. | 705/9 |
| 6,018,343 A | 1/2000 | Wang et al. | 345/356 |
| 6,034,683 A | 3/2000 | Mansour et al. | 715/764 |
| 6,038,395 A | 3/2000 | Chow et al. | |
| 6,038,542 A | 3/2000 | Ruckdashel | 705/9 |
| 6,043,816 A | 3/2000 | Williams et al. | |
| 6,067,087 A | 5/2000 | Krauss et al. | 715/762 |
| 6,067,551 A | 5/2000 | Brown et al. | 1/1 |
| 6,072,492 A | 6/2000 | Schagen et al. | 715/733 |
| 6,073,110 A | 6/2000 | Rhodes et al. | |
| 6,073,142 A | 6/2000 | Geiger et al. | |
| 6,085,206 A | 7/2000 | Domini et al. | 707/533 |
| 6,101,480 A | 8/2000 | Conmy et al. | 705/9 |
| 6,133,915 A | 10/2000 | Arcuri et al. | 715/779 |
| 6,154,755 A | 11/2000 | Dellert et al. | |
| 6,175,363 B1 | 1/2001 | Williams et al. | 345/334 |
| 6,188,403 B1 | 2/2001 | Sacerdoti et al. | 715/764 |
| 6,192,381 B1 | 2/2001 | Stiegemeier et al. | 715/210 |
| 6,195,094 B1 | 2/2001 | Celebiler | 715/764 |
| 6,199,102 B1 | 3/2001 | Cobb | |
| 6,211,879 B1 | 4/2001 | Soohoo | 715/854 |
| 6,216,122 B1 | 4/2001 | Elson | 707/5 |
| 6,219,670 B1 | 4/2001 | Mocek et al. | 707/102 |
| 6,222,540 B1 | 4/2001 | Sacerdoti | 345/440 |
| 6,230,173 B1 | 5/2001 | Ferrel et al. | |
| 6,230,309 B1 | 5/2001 | Turner et al. | |
| 6,232,971 B1 | 5/2001 | Haynes | 715/800 |
| 6,236,396 B1 | 5/2001 | Jenson et al. | 715/764 |
| 6,237,135 B1 | 5/2001 | Timbol | |
| 6,256,628 B1 | 7/2001 | Dobson et al. | 707/6 |
| 6,269,341 B1 | 7/2001 | Redcay, Jr. | 705/8 |
| 6,278,450 B1 | 8/2001 | Arcuri et al. | 345/334 |
| 6,289,317 B1 | 9/2001 | Peterson | 705/7 |
| 6,307,544 B1 | 10/2001 | Harding | 715/709 |
| 6,307,574 B1 | 10/2001 | Ashe | |
| 6,323,883 B1 | 11/2001 | Minoura et al. | 715/784 |
| 6,326,962 B1 | 12/2001 | Szabo | 715/762 |
| 6,327,046 B1 | 12/2001 | Miyamoto et al. | 358/1.15 |
| 6,341,277 B1 | 1/2002 | Coden et al. | 707/718 |
| 6,353,451 B1 | 3/2002 | Teibel et al. | 715/803 |
| 6,359,634 B1 | 3/2002 | Cragun et al. | 715/777 |
| 6,373,507 B1 | 4/2002 | Camara et al. | 345/825 |
| 6,381,740 B1 | 4/2002 | Miller et al. | 717/151 |
| 6,384,849 B1 * | 5/2002 | Morcos et al. | 715/810 |
| 6,385,769 B1 | 5/2002 | Lewallen | |
| 6,405,216 B1 | 6/2002 | Minnaert et al. | 707/104.1 |
| 6,424,829 B1 | 7/2002 | Kraft | 455/412.1 |
| 6,429,882 B1 | 8/2002 | Abdelnur et al. | 345/763 |
| 6,430,563 B1 | 8/2002 | Fritz et al. | 707/694 |
| 6,433,801 B1 | 8/2002 | Moon et al. | 345/840 |
| 6,433,831 B1 | 8/2002 | Dinwiddie et al. | 348/553 |
| 6,434,598 B1 | 8/2002 | Gish | 709/203 |
| 6,442,527 B1 | 8/2002 | Worthington | 705/8 |
| 6,456,304 B1 | 9/2002 | Angiulo et al. | 345/779 |
| 6,457,062 B1 | 9/2002 | Pivowar et al. | 709/248 |
| 6,459,441 B1 | 10/2002 | Perroux et al. | 345/837 |
| 6,466,236 B1 | 10/2002 | Pivowar et al. | 715/835 |
| 6,469,722 B1 | 10/2002 | Kinoe et al. | 345/837 |
| 6,469,723 B1 | 10/2002 | Gould | |
| 6,476,828 B1 | 11/2002 | Burkett et al. | 715/760 |
| 6,480,865 B1 | 11/2002 | Lee et al. | 715/523 |
| 6,484,180 B1 | 11/2002 | Lyons et al. | 1/1 |
| 6,493,006 B1 | 12/2002 | Gourdol et al. | 715/825 |
| 6,493,731 B1 | 12/2002 | Jones et al. | 715/234 |
| 6,507,845 B1 | 1/2003 | Cohen et al. | 707/608 |
| 6,546,417 B1 | 4/2003 | Baker | 709/206 |
| 6,564,377 B1 | 5/2003 | Jayasimha et al. | |
| 6,570,596 B2 | 5/2003 | Frederiksen | 715/808 |
| 6,578,192 B1 | 6/2003 | Boehme et al. | 717/115 |
| 6,583,798 B1 | 6/2003 | Hoek et al. | 345/822 |
| 6,618,732 B1 | 9/2003 | White et al. | 707/103 |
| 6,621,504 B1 | 9/2003 | Nadas et al. | 715/723 |
| 6,621,508 B1 | 9/2003 | Shiraishi et al. | 715/810 |
| 6,635,089 B1 | 10/2003 | Burkett et al. | 715/513 |
| 6,639,611 B1 | 10/2003 | Leduc | 715/764 |
| 6,664,983 B2 | 12/2003 | Ludolph | 715/775 |
| 6,680,749 B1 | 1/2004 | Anderson et al. | 348/231.99 |
| 6,686,938 B1 | 2/2004 | Jobs et al. | 345/835 |
| 6,691,281 B1 | 2/2004 | Sorge et al. | 715/503 |
| 6,701,513 B1 | 3/2004 | Bailey | |
| 6,707,476 B1 | 3/2004 | Hochstedler | 715/789 |
| 6,708,205 B2 | 3/2004 | Sheldon et al. | 709/206 |
| 6,721,402 B2 | 4/2004 | Usami | |
| 6,727,919 B1 * | 4/2004 | Reder et al. | 715/810 |
| 6,732,330 B1 | 5/2004 | Claussen et al. | 715/513 |
| 6,734,880 B2 | 5/2004 | Chang et al. | 715/738 |
| 6,750,890 B1 * | 6/2004 | Sugimoto | 715/838 |
| 6,778,990 B2 | 8/2004 | Garcia et al. | |
| 6,785,866 B1 | 8/2004 | Lewis et al. | 715/209 |
| 6,785,868 B1 | 8/2004 | Raff | 715/530 |
| 6,789,107 B1 | 9/2004 | Bates et al. | |
| 6,825,859 B1 | 11/2004 | Severenuk et al. | 345/764 |
| 6,826,727 B1 | 11/2004 | Mohr et al. | 715/235 |
| 6,826,729 B1 | 11/2004 | Giesen et al. | 715/837 |
| 6,850,255 B2 | 2/2005 | Muschetto | 715/788 |
| 6,857,103 B1 | 2/2005 | Wason | |
| 6,871,195 B2 | 3/2005 | Ryan et al. | 706/46 |
| 6,882,354 B1 | 4/2005 | Nielsen | 715/784 |
| 6,895,426 B1 | 5/2005 | Cortright et al. | |
| 6,904,449 B1 | 6/2005 | Quinones | 709/203 |
| 6,906,717 B2 | 6/2005 | Couckuyt et al. | 345/440 |
| 6,915,492 B2 * | 7/2005 | Kurtenbach et al. | 715/810 |

| Patent/Pub No. | Date | Name | Ref |
|---|---|---|---|
| 6,924,797 B1 | 8/2005 | MacPhail | 345/326 |
| 6,925,605 B2 | 8/2005 | Bates et al. | 709/206 |
| 6,928,610 B2 | 8/2005 | Brintzenhofe et al. | 715/202 |
| 6,928,613 B1 | 8/2005 | Ishii | |
| 6,931,623 B2 | 8/2005 | Vermeire et al. | |
| 6,941,304 B2 | 9/2005 | Gainey et al. | |
| 6,964,025 B2 * | 11/2005 | Angiulo et al. | 715/838 |
| 6,983,889 B2 | 1/2006 | Alles | 236/49.1 |
| 6,988,241 B1 | 1/2006 | Guttman et al. | 715/503 |
| 6,990,637 B2 * | 1/2006 | Anthony et al. | 715/851 |
| 6,990,652 B1 | 1/2006 | Parthasarathy et al. | |
| 6,990,654 B2 | 1/2006 | Carroll, Jr. | |
| 6,993,711 B1 | 1/2006 | Tanaka et al. | 715/513 |
| 7,027,463 B2 | 4/2006 | Mathew et al. | |
| 7,032,210 B2 | 4/2006 | Alloing et al. | |
| 7,039,596 B1 | 5/2006 | Lu | 705/8 |
| 7,039,863 B1 | 5/2006 | Caro et al. | 715/209 |
| 7,046,848 B1 | 5/2006 | Olcott | 382/176 |
| 7,051,276 B1 | 5/2006 | Mogilevsky et al. | 715/517 |
| 7,069,538 B1 | 6/2006 | Renshaw | |
| 7,085,999 B2 | 8/2006 | Maeda et al. | 715/236 |
| 7,093,162 B2 | 8/2006 | Barga et al. | |
| 7,107,525 B2 | 9/2006 | Purvis | 715/244 |
| 7,107,544 B1 | 9/2006 | Luke | 715/752 |
| 7,110,936 B2 | 9/2006 | Hiew et al. | 703/22 |
| 7,111,238 B1 | 9/2006 | Kuppusamy et al. | |
| 7,117,370 B2 | 10/2006 | Khan et al. | 713/186 |
| 7,120,868 B2 | 10/2006 | Salesin et al. | 715/249 |
| 7,149,983 B1 | 12/2006 | Robertson et al. | 715/810 |
| 7,152,207 B1 | 12/2006 | Underwood et al. | 715/526 |
| 7,181,697 B2 | 2/2007 | Tai et al. | 715/779 |
| 7,188,073 B1 | 3/2007 | Tam et al. | 705/9 |
| 7,188,158 B1 | 3/2007 | Stanton et al. | |
| 7,188,317 B1 | 3/2007 | Hazel | 715/804 |
| 7,206,813 B2 | 4/2007 | Dunbar et al. | |
| 7,206,814 B2 | 4/2007 | Kirsch | |
| 7,212,208 B2 | 5/2007 | Khozai | 345/440 |
| 7,216,301 B2 * | 5/2007 | Moehrle | 715/811 |
| 7,219,305 B2 | 5/2007 | Jennings | |
| 7,225,244 B2 | 5/2007 | Reynolds | |
| 7,234,132 B2 | 6/2007 | Lam | |
| 7,240,323 B1 | 7/2007 | Desai et al. | 717/100 |
| 7,246,311 B2 | 7/2007 | Bargeron et al. | 715/251 |
| 7,249,325 B1 | 7/2007 | Donaldson | 715/777 |
| 7,263,668 B1 * | 8/2007 | Lentz | 715/801 |
| 7,272,789 B2 | 9/2007 | O'Brien | 715/247 |
| 7,290,033 B1 | 10/2007 | Goldman et al. | 709/206 |
| 7,296,241 B2 | 11/2007 | Oshiro et al. | |
| 7,325,204 B2 | 1/2008 | Rogers | 715/792 |
| 7,328,409 B2 | 2/2008 | Awada et al. | 715/765 |
| 7,337,185 B2 | 2/2008 | Ellis et al. | 707/102 |
| 7,346,705 B2 | 3/2008 | Hullot et al. | 709/238 |
| 7,346,769 B2 | 3/2008 | Forlenza et al. | 713/151 |
| 7,356,772 B2 | 4/2008 | Brownholtz et al. | 715/752 |
| 7,360,174 B2 | 4/2008 | Grossman et al. | 715/854 |
| 7,362,311 B2 | 4/2008 | Filner et al. | 345/169 |
| 7,386,535 B1 | 6/2008 | Kalucha et al. | |
| 7,386,835 B1 | 6/2008 | Desai et al. | |
| 7,392,249 B1 * | 6/2008 | Harris et al. | 1/1 |
| 7,395,221 B2 | 7/2008 | Doss et al. | 705/9 |
| 7,395,500 B2 | 7/2008 | Whittle et al. | |
| 7,421,660 B2 | 9/2008 | Charmock et al. | 715/751 |
| 7,421,690 B2 | 9/2008 | Forstall et al. | 709/206 |
| 7,426,713 B2 | 9/2008 | Duggan et al. | |
| 7,472,117 B2 | 12/2008 | Dettinger et al. | 1/1 |
| 7,484,213 B2 | 1/2009 | Mathew et al. | |
| 7,499,907 B2 | 3/2009 | Brown et al. | 1/1 |
| 7,505,954 B2 | 3/2009 | Heidloff et al. | 707/1 |
| 7,530,029 B2 | 5/2009 | Satterfield et al. | 715/779 |
| 7,555,707 B1 | 6/2009 | Labarge et al. | |
| 7,567,964 B2 | 7/2009 | Brice et al. | 707/9 |
| 7,584,253 B2 | 9/2009 | Curbow et al. | |
| 7,627,561 B2 | 12/2009 | Pell et al. | 707/3 |
| 7,664,821 B1 | 2/2010 | Ancin et al. | 709/206 |
| 7,703,036 B2 | 4/2010 | Satterfield et al. | 715/777 |
| 7,707,255 B2 | 4/2010 | Satterfield et al. | 709/206 |
| 7,711,742 B2 | 5/2010 | Bennett et al. | 707/759 |
| 7,716,593 B2 | 5/2010 | Durazo et al. | 715/752 |
| 7,739,259 B2 | 6/2010 | Hartwell et al. | 707/706 |
| 7,747,966 B2 | 6/2010 | Leukart et al. | 715/792 |
| 7,788,598 B2 | 8/2010 | Bansal et al. | 715/810 |
| 7,802,199 B2 | 9/2010 | Shneerson et al. | |
| 7,831,902 B2 | 11/2010 | Sourov et al. | 715/220 |
| 7,853,877 B2 | 12/2010 | Giesen et al. | 715/711 |
| 7,856,596 B2 | 12/2010 | Crider et al. | 715/243 |
| 7,865,868 B2 | 1/2011 | Falzone Schaw et al. | |
| 7,870,465 B2 | 1/2011 | VerSteeg | 714/774 |
| 7,886,290 B2 | 2/2011 | Dhanjal et al. | 717/170 |
| 7,895,531 B2 | 2/2011 | Radtke et al. | 715/810 |
| 8,117,542 B2 | 2/2012 | Radtke et al. | |
| 8,146,016 B2 | 3/2012 | Himberger et al. | |
| 8,150,930 B2 | 4/2012 | Satterfield et al. | |
| 8,201,103 B2 | 6/2012 | Dukhon et al. | |
| 2001/0014900 A1 | 8/2001 | Brauer et al. | 707/513 |
| 2001/0032220 A1 | 10/2001 | Van Hoff | 707/513 |
| 2001/0035882 A1 * | 11/2001 | Stoakley et al. | 345/779 |
| 2001/0049677 A1 | 12/2001 | Talib et al. | 707/3 |
| 2002/0007380 A1 * | 1/2002 | Bauchot et al. | 707/530 |
| 2002/0029235 A1 | 3/2002 | Kawamoto | 709/206 |
| 2002/0036662 A1 | 3/2002 | Gauthier et al. | 345/835 |
| 2002/0037754 A1 | 3/2002 | Hama et al. | 455/566 |
| 2002/0052721 A1 | 5/2002 | Ruff et al. | 703/1 |
| 2002/0052880 A1 | 5/2002 | Fruensgaard et al. | 707/104.1 |
| 2002/0070977 A1 | 6/2002 | Morcos et al. | 345/810 |
| 2002/0078143 A1 | 6/2002 | DeBoor et al. | |
| 2002/0083054 A1 | 6/2002 | Peltonen et al. | 707/5 |
| 2002/0083097 A1 | 6/2002 | Warrington | |
| 2002/0091697 A1 | 7/2002 | Huang et al. | 707/10 |
| 2002/0091739 A1 | 7/2002 | Ferlitsch | 707/526 |
| 2002/0122071 A1 | 9/2002 | Camara et al. | |
| 2002/0133557 A1 | 9/2002 | Winarski | 709/207 |
| 2002/0135621 A1 | 9/2002 | Angiulo et al. | 345/838 |
| 2002/0140731 A1 | 10/2002 | Subramaniam et al. | 345/762 |
| 2002/0140740 A1 | 10/2002 | Chen | |
| 2002/0149623 A1 | 10/2002 | West et al. | 345/765 |
| 2002/0149629 A1 | 10/2002 | Craycroft et al. | 345/861 |
| 2002/0154178 A1 | 10/2002 | Barnett et al. | 715/853 |
| 2002/0156815 A1 | 10/2002 | Davia | 707/517 |
| 2002/0158876 A1 | 10/2002 | Janssen | 345/504 |
| 2002/0163538 A1 | 11/2002 | Shteyn | 345/752 |
| 2002/0175938 A1 | 11/2002 | Hackworth | 345/751 |
| 2002/0175955 A1 | 11/2002 | Gourdol et al. | 345/821 |
| 2002/0186257 A1 | 12/2002 | Cadiz et al. | 715/764 |
| 2002/0188632 A1 | 12/2002 | Su | 707/513 |
| 2002/0196293 A1 | 12/2002 | Suppan et al. | 345/853 |
| 2003/0009455 A1 | 1/2003 | Carlson et al. | 707/6 |
| 2003/0011638 A1 | 1/2003 | Chung | 345/808 |
| 2003/0011639 A1 | 1/2003 | Webb | 715/808 |
| 2003/0014421 A1 | 1/2003 | Jung | 707/102 |
| 2003/0014490 A1 | 1/2003 | Bates et al. | 709/206 |
| 2003/0022700 A1 * | 1/2003 | Wang | 455/566 |
| 2003/0025732 A1 | 2/2003 | Prichard | |
| 2003/0035917 A1 * | 2/2003 | Hyman | 428/67 |
| 2003/0038832 A1 | 2/2003 | Sobol | |
| 2003/0043200 A1 | 3/2003 | Faieta et al. | 345/804 |
| 2003/0043211 A1 | 3/2003 | Kremer et al. | |
| 2003/0046528 A1 | 3/2003 | Haitani et al. | 713/2 |
| 2003/0066025 A1 | 4/2003 | Garner et al. | 715/500 |
| 2003/0070143 A1 | 4/2003 | Maslov | 715/513 |
| 2003/0084035 A1 | 5/2003 | Emerick | 707/3 |
| 2003/0093490 A1 | 5/2003 | Yamamoto et al. | 709/213 |
| 2003/0097361 A1 | 5/2003 | Huang et al. | 707/10 |
| 2003/0097640 A1 | 5/2003 | Abrams et al. | 715/530 |
| 2003/0098891 A1 | 5/2003 | Molander | 715/841 |
| 2003/0106024 A1 | 6/2003 | Silverbrook et al. | 715/515 |
| 2003/0110191 A1 | 6/2003 | Handsaker et al. | 707/503 |
| 2003/0112278 A1 | 6/2003 | Driskell | 715/788 |
| 2003/0135825 A1 | 7/2003 | Gertner et al. | |
| 2003/0156140 A1 | 8/2003 | Watanabe | 345/810 |
| 2003/0160821 A1 | 8/2003 | Yoon | |
| 2003/0163455 A1 | 8/2003 | Dettinger et al. | 707/3 |
| 2003/0163537 A1 | 8/2003 | Rohall et al. | 709/206 |
| 2003/0167310 A1 | 9/2003 | Moody et al. | 709/206 |
| 2003/0169284 A1 | 9/2003 | Dettinger et al. | 715/708 |
| 2003/0184585 A1 | 10/2003 | Lin et al. | 345/763 |
| 2003/0195937 A1 | 10/2003 | Kircher et al. | 709/207 |
| 2003/0206646 A1 | 11/2003 | Brackett | |
| 2003/0218611 A1 | 11/2003 | Ben-Tovim et al. | 345/440 |

| | | | | | | |
|---|---|---|---|---|---|---|
| 2003/0225853 A1 | 12/2003 | Wang et al. ............... 709/217 | | 2005/0289156 A1 | 12/2005 | Maryka et al. ............ 707/100 |
| 2003/0226106 A1 | 12/2003 | McKellar et al. .......... 715/513 | | 2005/0289158 A1 | 12/2005 | Weiss et al. .............. 707/100 |
| 2003/0227487 A1 | 12/2003 | Hugh ....................... 715/777 | | 2006/0015816 A1 | 1/2006 | Kuehner et al. |
| 2003/0233419 A1 | 12/2003 | Beringer ................... 709/206 | | 2006/0020962 A1 | 1/2006 | Stark ........................ 725/32 |
| 2004/0003351 A1 | 1/2004 | Sommerer et al. ......... 715/251 | | 2006/0026033 A1 | 2/2006 | Brydon et al. ................ 705/1 |
| 2004/0006570 A1 | 1/2004 | Gelb et al. ................. 707/102 | | 2006/0026213 A1 | 2/2006 | Yaskin et al. ............. 707/200 |
| 2004/0012633 A1 | 1/2004 | Helt | | 2006/0026242 A1 | 2/2006 | Kuhlmann et al. |
| 2004/0021647 A1 | 2/2004 | Iwema et al. | | 2006/0036580 A1 | 2/2006 | Stata .......................... 707/3 |
| 2004/0030993 A1 | 2/2004 | Hong Huey et al. | | 2006/0036945 A1 | 2/2006 | Radtke et al. ............. 715/708 |
| 2004/0056894 A1 | 3/2004 | Zaika et al. ................ 345/762 | | 2006/0036946 A1 | 2/2006 | Radtke et al. ............. 715/711 |
| 2004/0083432 A1 | 4/2004 | Kawamura et al. ........ 715/526 | | 2006/0036950 A1 | 2/2006 | Himberger et al. ........ 715/732 |
| 2004/0088359 A1 | 5/2004 | Simpson | | 2006/0036964 A1 | 2/2006 | Satterfield |
| 2004/0090315 A1 | 5/2004 | Mackjust et al. ........ 340/426.13 | | 2006/0036965 A1 | 2/2006 | Harris et al. .............. 715/777 |
| 2004/0100504 A1 | 5/2004 | Sommer ................... 345/810 | | 2006/0041545 A1 | 2/2006 | Heidloff et al. ............... 707/4 |
| 2004/0100505 A1* | 5/2004 | Cazier ...................... 345/811 | | 2006/0047644 A1 | 3/2006 | Bocking et al. |
| 2004/0107197 A1 | 6/2004 | Shen et al. .................... 707/9 | | 2006/0053383 A1 | 3/2006 | Gauthier et al. ........... 715/764 |
| 2004/0109025 A1 | 6/2004 | Hullot et al. .............. 715/764 | | 2006/0064434 A1 | 3/2006 | Gilbert et al. ........... 707/104.1 |
| 2004/0109033 A1 | 6/2004 | Vienneau et al. .......... 345/863 | | 2006/0069604 A1 | 3/2006 | Leukart et al. ................ 705/9 |
| 2004/0117451 A1 | 6/2004 | Chung ...................... 709/207 | | 2006/0069686 A1 | 3/2006 | Beyda et al. ................ 707/10 |
| 2004/0119760 A1 | 6/2004 | Grossman et al. .......... 715/854 | | 2006/0080303 A1 | 4/2006 | Sargent et al. ............... 707/3 |
| 2004/0122789 A1 | 6/2004 | Ostertag et al. | | 2006/0095865 A1 | 5/2006 | Rostom .................... 715/810 |
| 2004/0125142 A1 | 7/2004 | Mock et al. ............... 345/765 | | 2006/0101051 A1 | 5/2006 | Carr et al. ................. 707/102 |
| 2004/0128275 A1* | 7/2004 | Moehrle ...................... 707/1 | | 2006/0101350 A1 | 5/2006 | Scott ........................ 715/779 |
| 2004/0133854 A1 | 7/2004 | Black ....................... 715/517 | | 2006/0117249 A1 | 6/2006 | Hu et al. ................... 715/255 |
| 2004/0142720 A1 | 7/2004 | Smethers ................ 455/550.1 | | 2006/0117302 A1 | 6/2006 | Mercer et al. ............. 717/131 |
| 2004/0153968 A1 | 8/2004 | Ching et al. | | 2006/0129937 A1 | 6/2006 | Shafron ..................... 715/733 |
| 2004/0164983 A1 | 8/2004 | Khozai ..................... 345/440 | | 2006/0132812 A1 | 6/2006 | Barnes et al. .............. 358/1.11 |
| 2004/0168153 A1 | 8/2004 | Marvin ..................... 717/120 | | 2006/0155689 A1 | 7/2006 | Blakeley et al. .............. 707/3 |
| 2004/0186775 A1 | 9/2004 | Margiloff et al. ............ 705/14 | | 2006/0161849 A1 | 7/2006 | Miller et al. ............... 715/744 |
| 2004/0189694 A1 | 9/2004 | Kurtz et al. | | 2006/0161863 A1 | 7/2006 | Gallo ........................ 715/810 |
| 2004/0192440 A1 | 9/2004 | Evans et al. | | 2006/0165105 A1 | 7/2006 | Shenfield et al. |
| 2004/0215612 A1 | 10/2004 | Brody ......................... 707/3 | | 2006/0168522 A1 | 7/2006 | Bala |
| 2004/0221234 A1 | 11/2004 | Imai ......................... 715/256 | | 2006/0173824 A1 | 8/2006 | Bensky ...................... 707/3 |
| 2004/0230508 A1* | 11/2004 | Minnis et al. ................ 705/35 | | 2006/0173961 A1 | 8/2006 | Turski et al. |
| 2004/0230906 A1 | 11/2004 | Pik et al. ................... 715/522 | | 2006/0218500 A1 | 9/2006 | Sauve et al. ............... 715/767 |
| 2004/0239700 A1 | 12/2004 | Baschy ..................... 715/781 | | 2006/0224946 A1 | 10/2006 | Barrett |
| 2004/0243938 A1 | 12/2004 | Weise et al. ............... 715/205 | | 2006/0242557 A1* | 10/2006 | Nortis, III ................. 715/509 |
| 2004/0260756 A1 | 12/2004 | Forstall et al. | | 2006/0242575 A1 | 10/2006 | Winser ..................... 715/530 |
| 2004/0261013 A1 | 12/2004 | Wynn et al. ............... 715/511 | | 2006/0242591 A1 | 10/2006 | Van Dok |
| 2004/0268231 A1 | 12/2004 | Tunning ................... 715/513 | | 2006/0248012 A1 | 11/2006 | Kircher et al. ............... 705/50 |
| 2004/0268270 A1 | 12/2004 | Hill et al. ................... 715/963 | | 2006/0259449 A1 | 11/2006 | Betz et al. .................... 707/1 |
| 2005/0004989 A1 | 1/2005 | Satterfield et al. ........... 709/206 | | 2006/0271869 A1 | 11/2006 | Thanu et al. .............. 715/764 |
| 2005/0004990 A1 | 1/2005 | Durazo et al. .............. 709/206 | | 2006/0271910 A1 | 11/2006 | Burcham et al. |
| 2005/0005235 A1 | 1/2005 | Satterfield et al. ........... 715/519 | | 2006/0282817 A1 | 12/2006 | Darst et al. |
| 2005/0005249 A1* | 1/2005 | Hill et al. ................... 715/963 | | 2006/0294452 A1 | 12/2006 | Matsumoto ................ 715/236 |
| 2005/0010871 A1 | 1/2005 | Ruthfield et al. ............ 715/712 | | 2006/0294526 A1 | 12/2006 | Hambrick et al. ........... 719/315 |
| 2005/0021504 A1 | 1/2005 | Atchison ..................... 707/3 | | 2007/0006206 A1 | 1/2007 | Dhanjal et al. |
| 2005/0022116 A1 | 1/2005 | Bowman et al. ........... 715/513 | | 2007/0033250 A1 | 2/2007 | Levin et al. |
| 2005/0033614 A1 | 2/2005 | Lettovsky et al. .............. 705/5 | | 2007/0050182 A1 | 3/2007 | Sneddon et al. .............. 704/2 |
| 2005/0039142 A1 | 2/2005 | Jalon et al. ................. 715/823 | | 2007/0050401 A1 | 3/2007 | Young et al. ............... 707/102 |
| 2005/0043015 A1 | 2/2005 | Muramatsu ............. 455/412.1 | | 2007/0055936 A1 | 3/2007 | Dhanjal et al. |
| 2005/0044500 A1 | 2/2005 | Orimoto et al. ............ 715/706 | | 2007/0055943 A1 | 3/2007 | McCormick |
| 2005/0055449 A1 | 3/2005 | Rappold, III .............. 709/228 | | 2007/0061306 A1 | 3/2007 | Pell et al. ..................... 707/3 |
| 2005/0057584 A1 | 3/2005 | Gruen et al. ............... 715/752 | | 2007/0061307 A1 | 3/2007 | Hartwell et al. .............. 707/3 |
| 2005/0086135 A1 | 4/2005 | Lu ............................. 705/30 | | 2007/0061308 A1 | 3/2007 | Hartwell et al. .............. 707/3 |
| 2005/0091576 A1 | 4/2005 | Relyea et al. | | 2007/0061705 A1 | 3/2007 | Ammerlaan |
| 2005/0097465 A1 | 5/2005 | Giesen et al. .............. 715/700 | | 2007/0061738 A1 | 3/2007 | Taboada et al. |
| 2005/0097511 A1 | 5/2005 | Bergman et al. | | 2007/0094608 A1 | 4/2007 | Getsch |
| 2005/0114778 A1 | 5/2005 | Branson et al. ............ 715/711 | | 2007/0106951 A1 | 5/2007 | McCormack et al. ........ 715/764 |
| 2005/0117179 A1 | 6/2005 | Ito et al. ................... 358/1.15 | | 2007/0143662 A1 | 6/2007 | Carlson et al. ............. 715/507 |
| 2005/0132010 A1 | 6/2005 | Muller | | 2007/0143671 A1 | 6/2007 | Paterson et al. ............. 715/209 |
| 2005/0132053 A1 | 6/2005 | Roth et al. ................. 709/227 | | 2007/0180040 A1 | 8/2007 | Etgen et al. ............... 709/207 |
| 2005/0138576 A1 | 6/2005 | Baumert et al. ............ 715/862 | | 2007/0185826 A1 | 8/2007 | Brice et al. ................... 707/1 |
| 2005/0144241 A1 | 6/2005 | Stata et al. | | 2007/0203991 A1 | 8/2007 | Fisher et al. |
| 2005/0144284 A1 | 6/2005 | Ludwig et al. ............. 709/226 | | 2007/0240057 A1 | 10/2007 | Satterfield et al. ........... 715/705 |
| 2005/0144568 A1 | 6/2005 | Gruen et al. ............... 715/822 | | 2007/0260996 A1 | 11/2007 | Jakobson ................... 715/781 |
| 2005/0172262 A1* | 8/2005 | Lalwani .................... 717/109 | | 2007/0279417 A1 | 12/2007 | Garg et al. ................. 345/440 |
| 2005/0177789 A1 | 8/2005 | Abbar et al. ................ 705/528 | | 2007/0282956 A1 | 12/2007 | Staats ........................ 709/206 |
| 2005/0183008 A1 | 8/2005 | Crider et al. ................ 715/517 | | 2007/0300168 A1 | 12/2007 | Bosma et al. ............. 715/820 |
| 2005/0203975 A1 | 9/2005 | Jindal et al. ................ 707/204 | | 2008/0005686 A1 | 1/2008 | Singh |
| 2005/0216863 A1 | 9/2005 | Schumacher et al. ....... 715/827 | | 2008/0034304 A1 | 2/2008 | Feuerbacher et al. ........ 715/764 |
| 2005/0223066 A1 | 10/2005 | Buchheit et al. | | 2008/0040682 A1 | 2/2008 | Sorenson et al. ........... 715/777 |
| 2005/0223329 A1* | 10/2005 | Schwartz et al. ............ 715/711 | | 2008/0052670 A1 | 2/2008 | Espinosa et al. |
| 2005/0234910 A1 | 10/2005 | Buchheit et al. | | 2008/0077571 A1 | 3/2008 | Harris et al. .................. 707/5 |
| 2005/0240902 A1 | 10/2005 | Bunker et al. | | 2008/0104505 A1 | 5/2008 | Keohane et al. ............ 715/246 |
| 2005/0251757 A1 | 11/2005 | Farn | | 2008/0109787 A1 | 5/2008 | Wang et al. |
| 2005/0256867 A1 | 11/2005 | Walther et al. ................ 707/5 | | 2008/0134138 A1 | 6/2008 | Chamieh et al. ............ 717/105 |
| 2005/0278656 A1 | 12/2005 | Goldthwaite et al. ....... 715/810 | | 2008/0141156 A1 | 6/2008 | Reik |
| 2005/0289109 A1 | 12/2005 | Arrouye et al. ............... 707/1 | | 2008/0141242 A1 | 6/2008 | Shapiro ..................... 717/174 |

| | | | | | | |
|---|---|---|---|---|---|---|
| 2008/0155555 | A1 | 6/2008 | Kwong ..................... 719/315 | WO | 98/20410 | 5/1998 |
| 2008/0178110 | A1 | 7/2008 | Hill et al. .................. 715/771 | WO | WO 99/04353 | 1/1999 |
| 2008/0209316 | A1 | 8/2008 | Zandstra | WO | WO 01/55894 | 8/2001 |
| 2008/0244440 | A1 | 10/2008 | Bailey | WO | WO 03/003240 A2 | 1/2003 |
| 2009/0007003 | A1 | 1/2009 | Dukhon et al. ............ 715/778 | WO | WO 03/098500 | 11/2003 |
| 2009/0012984 | A1 | 1/2009 | Ravid et al. ............... 707/101 | WO | WO 2007/033159 A1 | 3/2007 |
| 2009/0083656 | A1 | 3/2009 | Dukhon et al. ............ 715/781 | WO | WO 2007/027737 A1 | 8/2007 |
| 2009/0100009 | A1 | 4/2009 | Karp | WO | WO 2008/121718 A1 | 10/2008 |
| 2009/0106375 | A1 | 4/2009 | Carmel et al. ............. 709/206 | WO | 2009-158151 | 12/2009 |
| 2009/0217192 | A1 | 8/2009 | Dean et al. ................ 715/777 | WO | 2009-158171 | 12/2009 |
| 2009/0222763 | A1 | 9/2009 | Dukhon et al. ............ 715/808 | WO | 2009-158172 | 12/2009 |
| 2009/0249339 | A1 | 10/2009 | Larsson et al. | | | |
| 2009/0319619 | A1 | 12/2009 | Affronti | | | |
| 2009/0319911 | A1 | 12/2009 | McCann | | | |
| 2010/0011310 | A1 | 1/2010 | Rainisto | | | |
| 2010/0060645 | A1 | 3/2010 | Garg et al. ................. 345/440 | | | |
| 2010/0191818 | A1 | 7/2010 | Satterfield et al. ........ 709/206 | | | |
| 2010/0211889 | A1 | 8/2010 | Durazo et al. ............. 715/752 | | | |
| 2010/0223575 | A1 | 9/2010 | Leukart et al. ............ 715/779 | | | |
| 2010/0293470 | A1 | 11/2010 | Zhao et al. | | | |
| 2011/0072396 | A1 | 3/2011 | Giesen et al. ............. 715/841 | | | |
| 2011/0138273 | A1 | 6/2011 | Radtke et al. ............. 715/256 | | | |
| 2011/0296322 | A1 | 12/2011 | Dhanjal et al. ............ 715/760 | | | |

FOREIGN PATENT DOCUMENTS

| | | |
|---|---|---|
| CN | 1746914 | 3/2006 |
| EP | 0 774 722 A2 | 5/1997 |
| EP | 1 077 405 A2 | 2/2001 |
| EP | 1 223 503 | 7/2002 |
| EP | 1 376 337 | 2/2004 |
| EP | 1 462 999 A2 | 9/2004 |
| EP | 1 542 133 A2 | 6/2005 |
| GB | 2329813 | 3/1999 |
| GB | 2 391 148 | 1/2004 |
| ID | P 0027717 | 3/2011 |
| ID | P 0027754 | 3/2011 |
| ID | P 0029297 | 10/2011 |
| JP | 03-043824 | 2/1991 |
| JP | 04-186425 | 3/1992 |
| JP | 04-312186 | 11/1992 |
| JP | 05-204579 | 8/1993 |
| JP | 06-052282 | 2/1994 |
| JP | 06-342357 | 12/1994 |
| JP | 10-074217 | 3/1998 |
| JP | 10-326171 | 12/1998 |
| JP | 11-175258 | 7/1999 |
| JP | 11-259200 | 9/1999 |
| JP | 2001-034775 | 2/2001 |
| JP | 2001-503893 | 3/2001 |
| JP | 2001-337944 | 12/2001 |
| JP | 2003-101768 | 4/2003 |
| JP | 2003-015719 | 9/2003 |
| JP | 2003-256258 | 9/2003 |
| JP | 2003-256302 | 9/2003 |
| JP | 2004-078512 | 3/2004 |
| JP | 2004-086893 | 3/2004 |
| JP | 2004-102803 | 4/2004 |
| JP | 2004-512578 | 4/2004 |
| JP | 2004-145569 | 5/2004 |
| JP | 2004-159261 | 6/2004 |
| JP | 2004-342115 | 12/2004 |
| JP | 2005-032041 | 2/2005 |
| JP | 2005-182353 | 7/2005 |
| JP | 2005-236089 | 9/2011 |
| JP | 4832024 | 9/2011 |
| JP | 4832024 | 12/2011 |
| KR | 10-2005-0023805 A | 3/2005 |
| KR | 10-2005-0036702 A | 4/2005 |
| KR | 10-1130421 | 3/2012 |
| KR | 10-1149960 | 5/2012 |
| KR | 10-1149990 | 5/2012 |
| KR | 10-1159334 | 6/2012 |
| PH | 1-2005-000404 | 8/2011 |
| TW | 460839 | 10/2001 |
| TW | 490652 | 6/2002 |
| TW | 2003-05097 | 10/2003 |
| WO | 94-20921 | 9/1994 |
| WO | 96/10231 | 4/1996 |
| WO | 96-39654 | 12/1996 |

OTHER PUBLICATIONS

MS. Office 2003 (Microsoft Corporation, Microsoft Office Professional Edition 2003; 10 pages).*
ScreenShot of MS_Office_2003; (Microsoft Corporation, Microsoft Office Professional Edition 2003; 6 pages).*
Ribbons; Microsoft; © 2012 Microsoft; http://msdn.microsoft.com/en-us/library/windows/desktop/cc872782.aspx; 45 pages.*
AutoCAD 2011-Customiztion Guide; Feb. 2010; Autodesk, Inc.; 554 Pages; http://images.autodesk.com/adsk/files/acad_acg.pdf.*
U.S. Final Office Action dated Dec. 21, 2007 cited in U.S. Appl. No. 10/851,506.
U.S. Final Office Action dated Jan. 8, 2008 cited in U.S. Appl. No. 10/955,928.
U.S. Office Action dated Jan. 28, 2008 cited in U.S. Appl. No. 10/836,154.
U.S. Appl. No. 12/028,797, filed Feb. 9, 2008 entitled "Side-by-Side Shared Calendars".
U.S. Office Action dated Feb. 21, 2008 cited in U.S. Appl. No. 10/851,442.
Marshall School of Business, Workshop 1—Introduction to Outlook & E-mail, Apr. 6, 2000, pp. 1-11.
Jane Dorothy Calabria Burke, Ten Minute Guide to Lotus Notes 4.6, Publication date: Dec. 23, 1997, 2 pgs.
Bill Dyszel, Microsoft Outlook 2000 for Windows for Dummies, Copyright 1999, pp. 82-86, 102-103, 141,143.
Gina Danielle Venolia et al., Understanding Sequence and Reply Relationships within Email Conversations: A Mixed-Model Visualization, CHI 2003, Apr. 5-10, 2003, vol. No. 5, Issue No. 1, pp. 361-368.
U.S. Office Action dated Sep. 26, 2007 cited in U.S. Appl. No. 11/151,686.
U.S. Office Action dated Oct. 9, 2007 cited in U.S. Appl. No. 10/982,073.
U.S. Final Office Action dated Dec. 4, 2007 cited in U.S. Appl. No. 10/955,940.
Philippines Examiner's Action dated Aug. 19, 2008 cited in Application No. 1-2005-000405.
Chinese Second Office Action dated Oct. 10, 2008 cited in Application No. 200510092141.1.
Chinese Second Office Action dated Oct. 17, 2008 cited in Application No. 200510092139.4.
U.S. Final Office Action dated Oct. 28, 2008 cited in U.S. Appl. No. 11/151,686.
Microsoft Office Word 2003. Part of Microsoft Office Professional Edition 2003. Copyright 1983-2003 Microsoft Corporation.
U.S. Final Office Action dated Apr. 15, 2008 cited in U.S. Appl. No. 10/955,942.
Screendumps Microsoft Corporation, Microsoft Office Professional Edition 2003, 5 pgs.
U.S. Final Office Action dated May 28, 2008 cited in U.S. Appl. No. 10/982,073.
Chinese Official Action dated Mar. 21, 2008 cited in Chinese Application No. 200510092146.4.
Chinese Official Action dated Mar. 21, 2008 cited in Chinese Application No. 200510092139.4.
Philippine Official Action dated Apr. 21, 2008 cited in Philippine Application No. 1-2005-000405.
Philippine Official Action dated Apr. 21, 2008 cited in Philippine Application No. 1-2005-000406.
Chinese First Office Action dated Apr. 18, 2008 cited in Application No. 200510092142.6.

Chinese First Office Action dated May 23, 2008 cited in Application No. 200510089514.X.
Philippines Examiner's Action dated Sep. 12, 2008 cited in Application No. 1200500406.
Microsoft Office 11 Beta Layperson's Specification, Copyright 2002, Microsoft Corporation, 28 pgs.
FrontPage 11 Beta Layperson's Specification, Copyright 2002, Microsoft Corporation, 12 pgs.
Office 11 Beta Letter, Copyright 2002, Microsoft Corporation, 6 pgs.
Microsoft XDocs Beta Layperson Specification, Copyright 2002, Microsoft Corporation, 3 pgs.
Microsoft Publisher 11 Beta Layperson's Specification, Copyright 2002, Microsoft Corporation, 13 pgs.
U.S. Final Office Action dated Apr. 29, 2008 cited in U.S. Appl. No. 10/955,941.
Habraken, Microsoft Office XP 8 in 1, published Jun. 5, 2001, http://proquest.safaribooksonline.com/0789725096/, 12 pgs.
Word 2002, Chapter 14; Paradigm Publishing Inc., copyright 2002; http://www.emcp.com/tech_tutorials/sig_irc/Signature_Word_Chapter_14.ppt, 21 pgs.
Chilean Office Action dated Mar. 28, 2008 cited in Application No. 1770-05, no English Translation.
Chinese First Office Action dated Apr. 11, 2008 cited in Application No. 200510092141.1.
Microsoft Office Word 2003, Part of Microsoft Office Professional Edition 2003, 1983-2003 Microsoft Corporation, screen shot 1, 1 pp.
Screendumps—Microsoft Office, Microsoft Office Professional Edition 2003, Microsoft Corporation, 10 pages.
Screendumps—Microsoft Office Outlook, Microsoft Office Outlook Professional Edition 2003, Microsoft Corporation, 2 pages.
Chinese Second Office Action dated Nov. 21, 2008 cited in Appln No. 200510089514.X.
U.S. Official Action dated Jun. 19, 2008 cited in U.S. Appl. No. 10/851,506.
U.S. Official Action dated Jun. 20, 2008 cited in U.S. Appl. No. 10/955,928.
U.S. Official Action dated Jul. 17, 2008 cited in U.S. Appl. No. 10/955,940.
U.S. Official Action dated Dec. 23, 2008 in U.S. Appl. No. 10/955,942.
U.S. Official Action dated Jan. 6, 2009 in U.S. Appl. No. 10/955,941.
Chilean Second Office Action dated Mar. 4, 2009 cited in Appln No. 2512-2005.
U.S. Office Action dated Apr. 28, 2009 in U.S. Appl. No. 12/028,797.
Nielsen, Jacob. "Tabs, Used Right," Alertbox, Sep. 17, 2007, http://www.useit.com/alertbox/tabs.html, 6 pages.
"Managing the Code Editor and View" Microsoft Corporation, http://msdn.microsoft.com/en-us/library/z01zks9a(VS.71).aspx, 2008.
Agarwal, Vikash K., "Creating a Visually Arresting User-Interface: $A_3D$ Tab Control Example," Jan. 4, 2008, http://microsoft.apress.com/asptodayarchive/71723/creating-a-visually-arresting-user-interface-a-3d-tab-control-example, 12 pages.
"Omni Web Help," Omni Group, 2004, http://www.omnigroup.com/documentation/omniweb/browser/tabs.html, 2 pages.
Hepfner, Troy, "New SOCET CXP Interface Improves Usability," Sep. 2008, http://www.socetset.com/gxpmosaic/?p=95, 4 pages.
U.S. Appl. No. 12/372,386, filed Feb. 17, 2009 entitled "Command User Interface for Displaying Multiple Sections of Software Functionality Controls".
Chinese Office Action dated Apr. 3, 2009 cited in Appln No. 200510089514.X.
U.S. Office Action dated Mar. 18, 2009 in U.S. Appl. No. 11/401,470.
U.S. Office Action dated Apr. 7, 2009 in U.S. Appl. No. 10/955,940.
U.S. Office Action dated Nov. 25, 2008 cited in U.S. Appl. No. 11/154,278.
U.S. Office Action dated Dec. 11, 2008 cited in U.S. Appl. No. 10/982,073.
Chilean Office Action dated Nov. 27, 2008 cited in Appln No. 1768-2005.
Chilean Office Action dated Sep. 23, 2008 cited in Appln No. 1770-2005.
Chilean Office Action dated Nov. 27, 2008 cited in Appln No. 1769-2005.
Billo, E. Joseph. "Creating Charts: an Introduction," Excel for Chemists: . A Comprehensive Guide, http://www.ahut.edu.cn/yxsz/ahk/Teaching/Excel%for%20Chemists/ChQ2.pdf, 9 pages.
Screendumps—Microsoft Office, Microsoft Corporation, Microsoft Office Professional Edition 2003, 13 pages.
Russian Office Action dated Jul. 21, 2009 cited in Appln No. 2005125837/09(029011).
Russian Office Action dated Jul. 30, 2009 cited in Appln No. 2005125831/09(029005).
European Search Report dated Sep. 7, 2009 cited in EP Application No. 09006972.5-2211.
European Communication dated Sep. 14, 2009 cited in Appln. No. 07795391.7-1225.
U.S. Official Action dated Aug. 4, 2009 in U.S. Appl. No. 10/955,942.
U.S. Official Action dated Aug. 18, 2009 in U.S. Appl. No. 11/782,059.
U.S. Official Action dated Sep. 23, 2009 in U.S. Appl. No. 11/401,470.
Berliner E.M. et al., "Microsoft Office 2003", Feb. 24, 2004, p. 39-40, 120-124, 175-177, 233-234 [D1].
Berliner E.M. et al., "Microsoft Office 2003", Feb. 24, 2004, p. 173-178 [D2].
Israeli Office Action dated Sep. 6, 2009 cited in Appln No. 169716.
Israeli Office Action dated Sep. 7, 2009 cited in Appln No. 169718.
Russian Office Action dated Sep. 10, 2009 cited in Appln No. 2005125836/09(029010).
Russian Office Action dated Sep. 10, 2009 cited in Appln No. 2005125839/09(029013).
European Communication dated Sep. 28, 2009 cited in Appln No. 09006972.5-2211.
Chinese Office Action dated Oct. 16, 2009 cited in Appln No. 200510092142.6.
U.S. Official Action dated Nov. 24, 2009 in U.S. Appl. No. 11/445,393.
Perronne et al. "Building Java Enterprise Systems with J2EE", Publisher: Sams, Pub Date: Jun. 7, 2000 (pp. 1-8).
Russian Office Action dated Oct. 26, 2009 cited in Appln No. 2005120363/09(023023).
PCT Search Report and Written Opinion dated Dec. 29, 2009 cited in International Application No. PCT/US2009/046344.
U.S. Official Action dated Sep. 6, 2007 in U.S. Appl. No. 11/136,800.
U.S. Official Action dated Jul. 9, 2008 cited in U.S. Appl. No. 11/136,800.
U.S. Official Action dated Nov. 13, 2009 in U.S. Appl. No. 11/154,278.
U.S. Official Action dated Dec. 8, 2009 in U.S. Appl. No. 11/151,686.
U.S. Official Action dated Dec. 9, 2009 in U.S. Appl. No. 12/028,797.
U.S. Official Action dated Dec. 10, 2009 in U.S. Appl. No. 10/955,940.
U.S. Official Action dated Jan. 6, 2010 in U.S. Appl. No. 10/607,020.
U.S. Official Action dated Jan. 25, 2010 in U.S. Appl. No. 10/982,073.
T. Shih et al., "A Stepwise Refinement Approach to Multimedia Presentation Designs", IEEE, Oct. 1997, pp. 117-122.
U.S. Official Action dated Mar. 3, 2010 in U.S. Appl. No. 10/780,547 (Perkins matter).
U.S. Appl. No. 12/725,605, filed Mar. 17, 2010 entitled "Improved User Interface for Displaying Selectable Software Functionality Controls that are Relevant to a Selected Object".
U.S. Appl. No. 12/753,923, filed Apr. 5, 2010 entitled "Automatic Grouping of Electronic Mail".
Chinese Office Action dated Jan. 22, 2010 cited in Appln No. 200680032564.7.
Chinese Third Office Action dated Feb. 12, 2010 cited in Appln No. 200510092142.6.
Philippines Examiner's Action dated Mar. 11, 2010 cited in Appln No. 1-2005-000405.
Chinese Office Action dated Mar. 11, 2010 cited in Appln No. 200780020312.7.
Australian Office Action dated Mar. 25, 2010 cited in Appln No. 2005203411.
Australian Office Action dated Mar. 25, 2010 cited in Appln No. 2005203412.

Australian Office Action dated Mar. 26, 2010 cited in Appln No. 2005203409.
Australian Office Action dated Apr. 8, 2010 cited in Appln No. 2005203410.
U.S. Official Action dated Feb. 22, 2010 in U.S. Appl. No. 11/401,470.
U.S. Appl. No. 12/769,787, filed Apr. 29, 2010 entitled "Conversation Grouping of Electronic Mail Records".
U.S. Appl. No. 12/777,287, filed May 11, 2010 entitled "User Interface for Providing Task Management and Calendar Information".
U.S. Appl. No. 11/217,071, filed Aug. 30, 2005 entitled "Markup Based Extensibility for User Interfaces".
Clifton, The Application Automation layer—Using XML to Dynamically Generale GUI Elements—forms and controls, The Code Project, Jun. 2003, pp. 1-37.
Australian Office Action dated May 28, 2010 cited in Appln No. 2005202717.
U.S. Official Action dated Mar. 30, 2010 in U.S. Appl. No. 11/217,071.
U.S. Official Action dated Apr. 15, 2010 in U.S. Appl. No. 11/823,999.
U.S. Official Action dated May 5, 2010 in U.S. Appl. No. 10/851,506.
U.S. Official Action dated May 25, 2010 in U.S. Appl. No. 10/607,020.
U.S. Official Action dated Aug. 6, 2010 in U.S. Appl. No. 11/401,470.
Chinese Second Office Action dated Jul. 6, 2010 cited in Appln No. 200680033212.3.
Mexican Office Action dated Aug. 12, 2010 cited in Appln No. 2005/008354.
U.S. Official Action dated Aug. 2, 2010 in U.S. Appl. No. 10/955,942.
U.S. Official Action dated Sep. 21, 2010 in U.S. Appl. No. 11/217,071.
U.S. Official Action dated Sep. 27, 2010 in U.S. Appl. No. 10/836,154.
Israeli Office Action dated Oct. 28, 2010 cited in Appln No. 169716.
U.S. Official Action dated Dec. 8, 2010 in U.S. Appl. No. 10/851,506.
U.S. Official Action dated Dec. 16, 2010 in U.S. Appl. No. 11/430,562.
U.S. Official Action dated Dec. 20, 2010 in U.S. Appl. No. 11/445,393.
U.S. Official Action dated Dec. 20, 2010 in U.S. Appl. No. 12/574,256.
U.S. Official Action dated Dec. 29, 2010 in U.S. Appl. No. 12/028,787.
U.S. Official Action dated Jan. 5, 2011 in U.S. Appl. No. 11/823,999.
Korean Notice of Rejection dated Nov. 3, 2011 cited in Appln No. 10-2005-0067257.
Japanese Notice of Rejection dated Nov. 11, 2011 cited in Appln No. 2008-530229.
Chinese Office Action dated Nov. 18, 2011 cited in Appln No. 200910148820.4.
Chinese Office Action dated Nov. 29, 2011 cited in Appln No. 200980124383.0.
Chinese Third Office Action dated Dec. 5, 2011 cited in Appln No. 200680018095.3.
U.S. Appl. No. 11/430,561, filed May 9, 2006 entitled "Integrated Search and Find User Interface".
U.S. Appl. No. 11/430,562, filed May 9, 2006 entitled "Expanded Search and Find User Interface".
U.S. Appl. No. 11/430,416, filed May 9, 2006 entitled "Search and Find Using Expanded Search Scope".
U.S. Appl. No. 12/059,644, filed Mar. 31, 2008 entitled "Associating Command Surfaces with Multiple Active Components".
U.S. Appl. No. 09/620,876, filed Jul. 21, 2000 entitled "On-Object User Interface".
U.S. Appl. No. 10/780,547, filed Feb. 17, 2004 entitled "Method and System for Separation of Content and Layout Definitions in a Display Description" (Perkins Case).
Screendumps—Microsoft Office (Microsoft Corporation, Microsoft Office Professional Edition 2003; 16 pages).
Padwick, Gordon "Using Microsoft Outlook 2000," 1999 Que Publishing, pp. 530-533.
Slovak, Ken. "Absolute Beginner's Guide to Microsoft Office Outlook 2003." 2003, Que Publishing, pp. 237-241.
Microsoft Press, Microsoft Computer Dictionary, Microsoft Press, Fifth Edition, pp. 374, 382, 2002.
Riggsby, McCoy, Haberman and Falciani, "Mastering Lotus Notes and Domino 6." 2003, pp. 18, 22, 33-35, 47, 122, 123, 215-241, 378.
Find any file or email on your PC as fast as you can type! , http://www.xl.com, 2003, 1 page.
"About Google Desktop Search", http://www.desktop.google.com/about.html, Oct. 15, 2004, 8 pages.
"Lookout", http://www.lookoutsoft.com, Apr. 22, 2005, 20 pages.
"Yahoo to test desktop search", http://news.com.com/yahoo+to+test+desktop+searcach/2100-1032_3-5486381.html, Dec. 9, 2004, 6 pages.
"Microsoft reinvents its own wheel", http://www.theinquirer.net/default.aspx?article=20214, Dec. 14, 2004, 5 pages.
"Microsoft Desktop Search (beta)", http://www.pcmag.com/article2/0.1895.1771841.00.asp, Mar. 2, 2005.
"Windows Desktop Search". Http://kunal.kundale.net/reviews/wds.html, Jul. 10, 2005, 7 pages.
"Microsoft Enters Desktop Search Fray", http://www.internetnews.com/ent-news/article.php/3447331, Dec. 13, 2004, 5 pages.
"User Interface Architecture," Data Master 2003, 2 pages.
Kim et al., "Migrating Legacy Software Systems to CORBA based Distributed Environments through an Automatic Wrapper Generation Technique," http://www.cs.colostate.edu/~bieman/Pubs/KimBieman00.pdf, accessed on Jan. 28, 2009, 6 pages.
Selca, Viki "Customizing the Office Fluent User interface in Access 2007," Microsoft Corporation, Dec. 2006, 22 pages.
Parry; "CREWS: A Component-Driven, Run-Time Extensible Web Service Framework"; http://eprints.ru.ac.za/74/01/Parry-MSC.pdf; Dec. 2003; 103 Pgs.
Louw, et al.; "Extensible Web Browser Security"; http://www.cs.uic.edu/~venkat/research/papers/extensible-browser-dimva07.pdf; pp. 1-20, Oct. 16, 2007.
W3C, "Positioning HTML Elements with Cascading Style Sheets," Aug. 19, 2007, pp. 1-14, Retrieved from the Internet <http://www.w3.org/TR/NOTE-layout>.
C. Jacobs et al., "Adaptive Grid-Based Document Layout", Microsoft Research, ACM, Jul. 2003, pp. 838-847.
J. Bateman et al., "Towards Constructive Text, Diagram, and Layout Generation for Information Presentation", Association for Computational Linguistics, 2001, pp. 409-449.
S. Feiner, "A Grid-Based Approach to Automating Display Layout", In Proceedings of Graphics Interface'88, pp. 249-254.
K. Gajos et al., "Supple: Automatically Generating User Interfaces", ACM, Jan. 2004, pp. 1-8.
NZ Application No. 541301, Examination Report dated Jul. 25, 2005.
NZ Application No. 541299, Examination Report dated Jul. 25, 2005.
Chilean Second Office Action dated Nov. 4, 2009 cited in Appln No. 1770-2005.
Chilean Office Action dated Dec. 4, 2009 cited in Appln No. 1768-2005.
Chilean Second Office Action dated Jan. 29, 2010 cited in Appln No. 1769-2005.
PCT Search Report and Written Opinion dated Nov. 30, 2009 cited in International Application No. PCT/US2009/046341.
U.S. Official Action dated Jun. 14, 2007 in U.S. Appl. No. 10/780,547 (Perkins matter).
U.S. Official Action dated Oct. 4, 2007 in U.S. Appl. No. 10/780,547 (Perkins matter).
U.S. Official Action dated May 14, 2008 in U.S. Appl. No. 10/780,547 (Perkins matter).
U.S. Official Action dated May 30, 2008 in U.S. Appl. No. 11/430,562.
U.S. Official Action dated Jun. 27, 2008 cited in U.S. Appl. No. 11/430,416.
U.S. Official Action dated Nov. 13, 2008 in U.S. Appl. No. 11/430,562.
U.S. Official Action dated Jan. 9, 2009 in U.S. Appl. No. 11/430,561.
U.S. Official Action dated Feb. 20, 2009 in U.S. Appl. No. 10/780,547 (Perkins matter).

U.S. Official Action dated Jun. 19, 2009 in U.S. Appl. No. 11/430,562.
U.S. Official Action dated Aug. 17, 2009 in U.S. Appl. No. 11/430,561.
U.S. Official Action dated Sep. 15, 2009 in U.S. Appl. No. 10/780,547 (Perkins matter).
U.S. Official Action dated Jan. 7, 2010 in U.S. Appl. No. 11/430,562.
U.S. Official Action dated Feb. 18, 2010 in U.S. Appl. No. 11/782,059.
U.S. Official Action dated Feb. 19, 2010 in U.S. Appl. No. 10/955,942.
Aoyagi, Hideo, "Mail Mac Fan Special 33"; Manichi Communications Inc., Mar. 1, 2004, 5 pgs.
Morita, Utako; "Literature Searching System, 'JDream'"; Online Search; vol. 23, No. 4; The Society of Japan Terminal, Dec. 2002; 5 pgs.
Milstein, Sarah; "The Missing Manual: The book that should have been in the box", First Edition; O'Reilly Japan, Inc.; Nov. 25, 2004; 1 pg.
Cole; "New Arrival! Forefront of Downloading"; Mac People; vol. 11, No. 10; ASCII Corporation; Aug. 31, 2005; 1 pg.
Sada, Morihiro; "Clue for Managing Common Data Filed on Server"; Business Personal Computer Age; vol. 15, No. 7; Dempa Publications, Inc.; Jul. 1, 1997; 1 pg.
Japanese Notice of Rejection dated Nov. 25, 2011 cited in Appln. No. 2008-531249.
Korean Notice of Rejection dated Jan. 30, 2012 cited in Appln No. 10-2004-0048176.
Japanese Notice of Rejection dated Feb. 3, 2012 cited in Appln No. 2008-530218.
U.S. Official Action dated Jan. 26, 2012 in U.S. Appl. No. 12/464,584.
U.S. Appl. No. 13/027,289, filed Feb. 15, 2011 entitled "Floating Command Object".
Microsoft Press, Microsoft Computer Dictionary, Microsoft Press, Fifth Edition, 2002, pp. 374, 382.
Halvorson et al., Microsoft Office Professional Official Manual, Aug. 20, 2002, 10 pgs.
Adler, "Emerging Standards for Component Software," Cybersquare, 1995 IEEE, 10 pgs.
Chamberland, et al., "IBM VisualAge for Java," vol. 37, No. 3, 1998, 26 pgs., http://researchweb.watson.ibm.com/joumal/sj/373/chamberland.html [Accessed Feb. 6, 2007].
Zykov, "ConceptModeller: a Problem-Oriented Visual SDK for Globally Distributed Enterprise Systems." Proceedings of the 7th International Workshop on Computer Science and Information Technologies, CSIT 2005, 4 pgs.
"Create Office add-ins: ribbons, toolbars, taskpanes, menus etc.", http://www.add-in-express.com/creating-addins-blog/feed/, Jul. 4, 2007.
"RibbonX API: Extend the 2007 Office System with Your Own Ribbon Tabs and Controls", 2007, Microsoft Corporation, http://msdn.microsoft.com/msdnmag/issues/07/02RibbonX/de-fault.aspx.
"What's New in Excel 2007", Feb. 26, 2007.
Whitechapel et al., "Microsoft Visual Studio 2005 Tools for the 2007 Microsoft Office", Sep. 2006, http://72.14.235.104/search?q=cache:kXdufDB6o-wJ:download.microsoft.com/download/3/2/d/32db7049-bc04-4c79-a91b-7f62eaae754a/VSTO2005SE_Tutorial.
doc+ This+tutorial+focuses+on+the+new+features+introduced+in+VSTO+2005_SE&hl=en&ct=clnk&cd=3&gl=in.
PCT Written Opinion and Search Report dated Jan. 9, 2007 cited in International Application No. PCT/US2006/033809.
European Search Report dated Nov. 25, 2008 cited in Application EP 06 79 0087.
European Office Action mailed Mar. 9, 2009, cited in Appln No. 06790087.8.
Chinese Office Action dated Nov. 27, 2009 cited in Appln No. 200680033212.3.
Russian Office Action dated Dec. 28, 2009 cited in Appln No. 2005125836/09(029010).
Mexican Office Action dated May 4, 2010 cited in Appln No. 2005/008354.
Israeli Office Action dated Jul. 5, 2010 cited in Appln No. 169718.

Notice on Reexamination dated Jan. 21, 2011 cited in Appln No. 200510089514.X.
Chinese Third Office Action dated Feb. 10, 2011 cited in Appln No. 200680033212.3.
U.S. Official Action dated Sep. 15, 2009 in U.S. Appl. No. 11/217,071.
U.S. Official Action dated Feb. 11, 2011 in U.S. Appl. No. 11/401,470.
"The New "Office 2007" User Interface", Microsoft Corporation © 2005, 32 pgs.
"The New Look in Office 12 / Office 2007", Office Watch, posted Sep. 20, 2005, 9 pgs.
Atwood, "Sometime a Word is Worth a Thousand Icons", Coding Horror, Feb. 22, 2006, 9 pgs.
PCT Written Opinion and Search Report dated Nov. 29, 2010 cited in International Application No. PCT/US2010/034277.
Egypt Official Decision dated Mar. 14, 2011 cited in Appln No. 2005080371.
Malaysian Substantive Examination Adverse Report dated Mar. 15, 2011 cited in Appln No. PI 20053260.
2nd Notice on Reexamination dated Mar. 25, 2011 cited in Appln No. 200510089514.X.
U.S. Official Action dated Mar. 14, 2011 in U.S. Appl. No. 12/163,784.
U.S. Official Action dated Apr. 21, 2011 in U.S. Appl. No. 11/445,393.
U.S. Official Action dated Apr. 21, 2011 in U.S. Appl. No. 12/574,256.
U.S. Appl. No. 13/102,633, filed May 6, 2011 entitled "Markup Based Extensibility for User Interfaces".
Philippines Examiner's Action dated Apr. 12, 2011 cited in Appln No. 1-2005-00404.
Japanese Notice of Rejection dated May 6, 2011 cited in Appln. No. 2005-236089.
Japanese Notice of Rejection dated May 6, 2011 cited in Appln. No. 2005-236087.
Chinese Second Office Action dated May 19, 2011 cited in Appln No. 200780020312.7.
U.S. Official Action dated May 5, 2011 in U.S. Appl. No. 10/836,154.
U.S. Official Action dated May 12, 2011 in U.S. Appl. No. 12/753,923.
U.S. Official Action dated May 19, 2011 in U.S. Appl. No. 11/430,562.
U.S. Official Action dated May 19, 2011 in U.S. Appl. No. 10/851,506.
Seo et al, "Hangul Office 2000 Tutoring Book", Sep. 15, 2000, 16 pgs.
Office 2007, Microsoft, Released on Nov. 6, 2006, 23 pgs.
Mexican Office Action dated Jan. 6, 2011 cited in Appln No. PA/a/2005/008354.
Mexican Office Action dated Mar. 31, 2011 cited in Appln No. PA/a/2005/008351.
Mexican Office Action dated Mar. 31, 2011 cited in Appln No. PA/a/2005/008349.
Mexican Office Action dated Mar. 31, 2011 cited in Appln No. PA/a/2005/008350.
Korean Notice of Rejection dated May 17, 2011 cited in Appln No. 10-2004-48176.
Russian Office Action dated Jun. 14, 2011 cited in Appln No. 2008147090.
U.S. Official Action dated Jun. 9, 2011 in U.S. Appl. No. 12/464,584.
Marsh, Bruce, Integrating Spreadsheet Templates and Data Analysis Into Fluid Power Instruction, Journal of Industrial Technology, vol. 16, No. 4, Aug. 2000-Oct. 2000. http://www.nait.org/jit/Articles/marsh071200.pdf, 7 pages.
Oracle Discoverer Desktop User's Guide; 10g (9.0.4) for Windows; Part No. B10272-01; published 2003; http://download-uk.oracle.com/docs/cd/B12166_01/bi/B10272_01/3graph.htm; pp. 1-18.
Lisa K. Averett; Joshua R. Knisley; Mark A. Marvin; Haiti: Projecting Tactical Network and Systems Management; 1995 IEEE pp. 906-910.
Mexican Office Action dated Feb. 5, 2009 cited in Appln No. PA/a/2005/008349.

Mexican Office Action dated Mar. 3, 2009 cited in Appln No. PA/a/ 2005/008351 English language only.
Chinese Third Office Action dated Jun. 19, 2009 cited in Appln No. 200510092139.4.
Russian Office Action dated Jun. 24, 2009 cited in Appln No. 2005120363/28(023023).
U.S. Official Action dated Feb. 22, 2008 in U.S. Appl. No. 11/445,393.
U.S. Official Action dated Oct. 8, 2008 cited in U.S. Appl. No. 11/445,393.
U.S. Official Action dated Jun. 1, 2009, U.S. Appl. No. 11/445,393.
U.S. Official Action dated Jun. 8, 2009 in U.S. Appl. No. 10/982,073.
U.S. Official Action dated Jun. 10, 2009 in U.S. Appl. No. 11/154,278.
U.S. Official Action dated Jun. 11, 2009 in U.S. Appl. No. 11/151,686.
U.S. Official Action dated Jun. 24, 2009 in U.S. Appl. No. 10/607,020.
The Discussion Board Component of Blackboard: An Instructor's Guide; Aug. 2004; 23 pgs.
Hock, "Yahoo! to the Max"; May 10, 2005; 5 excerpted pgs.
Homeworking Forum; archived Dec. 6, 2004; 11 pgs.
Gina Danielle Venolia et al., Supporting Email Workflow, revised Dec. 2001; 11 pgs.
Mock et al., "An Experimental Framework for Email Categorization and Management", Sep. 9-12, 2001, 3 pgs.
Yang, "Email Categorization Using Fast Machine Learning Algorithms", 2002, 8 pgs.
Islam et al., "Email Categorization Using Multi Stage Classification Technique", 2007, 3 pgs.
"Look and Layout", retrieved at <<http://liv.ac.uk/csd/email/outlook/layout.htm>>, University of Liverpool, 9 pgs, Feb. 29, 2008.
"Preview Pane in Conversation: 4 pane view", 2005, Zinbra Inc., 3 pgs.
"Reading Pane in Conversation View", retrieved at <<http://www.zimbra.com/forums/users/5918-reading-pane-conversation-view.html>>, 5 pgs, Feb. 29, 2008.
New Zealand Office Action dated Oct. 14, 2009 cited in NZ Application No. 566363.
European Office Action dated Jun. 15, 2010 cited in EP Application No. 06814358.5.
Russian Office Action dated Jul. 26, 2010 cited in RU Application No. 2008109034, w/translation.
Chinese Office Action dated Nov. 11, 2010 cited in CN Application No. 200680032789.2, w/translation.
Russian Office Action dated Nov. 12, 2010 cited in Application No. 2008109034, w/translation.
Australian OA dated Jan. 17, 2011 cited in Application No. 2006287408.
Chinese Second Office Action dated Apr. 7, 2011 cited in Application No. 200680032789.2, w/translation.
Japanese Office Action dated Jun. 10, 2011 cited in JP Application No. 2008-530229, w/translation.
Chinese Third Office Action dated Jun. 21, 2011 cited in Appln No. 200680030421.2.
Chinese Second Office Action dated Jul. 14, 2011 cited in Appln No. 20680018095.3.
Chinese Decision on Rejection dated Jul. 21, 2011 cited in Appln No. 20068032789.2.
U.S. Official Action dated Oct. 5, 2009 in U.S. Appl. No. 11/332,822.
U.S. Official Action dated Apr. 23, 2010 in U.S. Appl. No. 12/144,642.
U.S. Official Action dated Jun. 25, 2010 in U.S. Appl. No. 11/332,822.
U.S. Official Action dated Sep. 16, 2010 in U.S. Appl. No. 12/144,642.
U.S. Official Action dated Jan. 6, 2011 in U.S. Appl. No. 12/142,927.
U.S. Official Action dated Feb. 1, 2011 in U.S. Appl. No. 11/332,822.
U.S. Official Action dated Feb. 1, 2011 in U.S. Appl. No. 12/144,642.
U.S. Official Action dated Jun. 7, 2011 in U.S. Appl. No. 11/332,822.
U.S. Official Action dated Jun. 7, 2011 in U.S. Appl. No. 12/059,644.
U.S. Official Action dated Jul. 8, 2011 in U.S. Appl. No. 11/401,470.
U.S. Official Action dated Jul. 8, 2011 in U.S. Appl. No. 12/163,784.

U.S. Official Action dated Aug. 3, 2011 in U.S. Appl. No. 12/142,927.
U.S. Appl. No. 11/154,278, filed Jun. 16, 2005 entitled "Cross Version and Cross Product User Interface Compatibility".
U.S. Appl. No. 11/151,686, filed Jun. 13, 2005 entitled "Floating Command Object".
U.S. Appl. No. 11/401,470, filed Apr. 10, 2006 entitled "Command User Interface for Displaying Selectable Functionality Controls in a Database Application".
U.S. Appl. No. 10/982,073, filed Nov. 5, 2004 entitled "Gallery User Interface Controls".
U.S. Appl. No. 10/607,020, filed Jun. 26, 2003 entitled "Side-by-Side Shared Calendars".
U.S. Appl. No. 10/741,407, filed Dec. 19, 2003 entitled "Methods, Systems, and Computer-Readable Mediums for Providing Persisting and Continuously Updating Search Folders".
U.S. Appl. No. 11/782,059, filed Jul. 24, 2007 entitled "Methods, Systems, and Computer-Readable Mediums for Providing Persisting and Continuously Updating Search Folders".
U.S. Appl. No. 10/836,154, filed Apr. 30, 2004 entitled "Combined Content Selection and Display User Interface".
U.S. Appl. No. 10/848,774, filed May 19, 2004 entitled "Automatic Grouping of Electronic Mail".
U.S. Appl. No. 10/851,442, filed May 21, 2004 entitled "Conversation Grouping of Electronic Mail Records".
U.S. Appl. No. 10/851,506, filed May 21, 2004 entitled "Adaptive Multi-Line View User Interface".
U.S. Appl. No. 10/955,941, filed Sep. 30, 2004 entitled "An Improved User Interface for Displaying Selectable Software Functionality Controls that are Relevant to a Selected Object".
U.S. Appl. No. 10/955,940, filed Sep. 30, 2004 entitled "An Improved User for Displaying Selectable Software Functionality Controls that are Contextually Relevant to a Selected Object".
U.S. Appl. No. 10/955,942, filed Sep. 30, 2004 entitled "An Improved User Interface for Displaying a Gallery of Formatting Options Applicable to a Selected Object".
U.S. Appl. No. 10/955,928, filed Sep. 30, 2004 entitled "User Interface for Providing Task Management and Calendar Information".
U.S. Appl. No. 10/800,056, filed Mar. 12, 2004 entitled "Method and System for Data Binding in a Block Structured User Interface Scripting Language".
Charles Rich et al., "Segmented Interaction History in a Collaborative Interface Agent," 1997, ACM, pp. 23-30.
Andrew Dwelly, "Functions and Dynamic User Interface," 1989, ACM, pp. 371-381.
Gordon Kurtenbach et al., "The Hotbox: Efficient Access to a Large Number of Menu-items," ACM, 1999, pp. 231-237, May 1999.
Charles Rich et al., "Adding a Collaborative Agent to Graphical User Interfaces," 1996, ACM, pp. 21-30.
Boyce, "Microsoft Outlook Inside Out," 2001, pp. 67, 68, 109, 110, 230, 231, 310, 316-318, 798.
Halvorson et al., "Microsoft Office XP Inside Out," 2001, pp. 1005-1009, 1015, 1023-1028, 1036-1039, 1093.
Riggsby et al., "Mastering Lotus Notes and Domino 6," 2003, pp. 135-139.
Riggsby et al., "Mastering Lotus Notes and Domino 6," 2003, pp. 135-138, 607-612.
Khare et al., "The Origin of (Document) Species," University of California, 1998, 9 pgs.
"Separate Structure and Presentation," http://www.webreference.com/html/tutorial5/1.html, Aug. 20, 1998, 4 pgs.
"The Style Attribute and CSS Declarations," http://www.webreference.com/html/tutorial5/2, Aug. 20, 1998, 4 pgs.
"What's Hot in Internet Services?" http://www.webreference.com/html/tutoria15/3, Aug. 20, 1998, 3 pgs.
"The Style Element & CSS Selectors," http://www.webreference.com/html/tutorial5/4.html, Aug. 20, 1998, 3 pgs.
http://www.webreference.com/html/tutorial5/5.html, Aug. 20, 1998, 3 pgs.
"ID & Class Selectors, Pseudoclasses," http://www.webreference.com/html/tutorial5/6.html, Aug. 20, 1998, 3 pgs.
http://www.webreference.com/html/tutoria15/7.html, Aug. 20, 1998, 3 pgs.

http://www.webreference.com/html/tutorial5/8.html, Aug. 20, 1998, 2 pgs.
"External Style Sheets," http://www.webreference.com/html/tutoria15/9.html, Aug. 20, 1998, 3 pgs.
Raman, "Cascaded Speech Style Sheets," 1997, 7 pgs.
"Primary Windows," http://www-03.ibm.com/servers/eserver/iseries/navigator/guidelines/primary.html, 23 pgs, Feb. 23, 2007.
Schumaker, "User Interface Standards," http://msdn2.microsoft.com/en-us/library/aa217660(office.11.d=printer).aspx, Sep. 2001, 5 pgs.
Budinsky et al., "WebSphere Studio Overview," http://researchweb.watson.ibm.com/journal/sj/432/budinsky.html, May 6, 2004, 25 pgs.
Gordon Padwick, Using Microsoft Outlook 2000, Que, Sp. Ed., May 1999.
Becker et al., "Virtual Folders: Database Support for Electronic Messages Classification," Pontificia Universidade Catolica do Rio Grande do Sul, Porto Alegre, Brazil, pp. 163-170, 2010.
Goldberg et al., "Using Collaborative Filtering to Weave an Information Tapestry," Communication of the ACM, vol. 35, No. 12, pp. 61-70, Dec. 1992.
Liu et al., "Continual Queries for Internet Scale Event-Driven Information Delivery," IEEE Transactions on Knowledge and Data Engineering, vol. 11, Issue 1, pp. 610-628, 1999.
Chen et al., "NiagaraCQ: A Scalable Continuous Query System for Internet Databases," Int. Conf. on Management of Data, Proc. of the 2000 ACM SIGMOD Int. Conf. on Management of Data, pp. 379-390, 2000.
Marshall School of Business: "Workshop IV—Calendar," http://www.marshall.usc.edu/computing/PDF_Files/Outlook/Workshop4, PDF, Apr. 10, 2000, pp. 1-4.
M. Williams, "Programming Windows NT4: Unleashed," Sams Publishing, Indianapolis, 1996, pp. index & 167-185.
"Microsoft Outlook 2000: Introduction to Calendar," Version Mar. 25, 2002, http://www.uakron.edu/its/learning/training/docs/Calendar032502.pdf, Mar. 25, 2002, pp. 1-52.
Screen Dumps of Microsoft Outlook (1999, pp. 1-3).
"To-do List—effective task management software" [on line], Aug. 3, 2004, http://web.archive.org/web/20040804103245/www.htpshareware.com/todolist/changes.txt and http://web.archive.org/web/20040803075026/www.htpshareware.com/todolist/index.htm>.
"Rainy's Rainlendar" [online], Aug. 12, 2004, http://web.archive.org/web/20040811043048/www.ipi.fi/~rainy/Rainlendard/Manual.html and http://web.archive.org/web/20040812092939/http://www.ipi.fi/~rainy/index.php?pn=probjects&project=rainlendar>.
Microsoft Windows XP Professional, Version 2002, Service pack 2, 3 pgs.
Camarda, Using Microsoft Word 97, copyright 1997, QUE Corporation, pp. 412, 968.
Danish Written Opinion Appl. No. SG 200504508-3 dated Sep. 18, 2006.
Danish Search Report Appl. No. SG 200504475-5 dated Sep. 19, 2006.
NZ Application No. 541300, Examination Report dated Jul. 25, 2005.
Australian Search Report dated Jan. 16, 2007 cited in Singapore Application No. 200504474-8.
PCT Search Report dated Feb. 26, 2007 cited in International Application No. PCT/US2006/034993.
European Communicated dated Oct. 20, 2005 cited in EP Application No. 04102463.0-2211 PCT/.
Australian Written Opinion/Search Report cited in Singapore Application No. 200505257-6 mailed Feb. 12, 2007.
U.S. Office Action dated Dec. 23, 2003 cited in U.S. Appl. No. 09/896,384.
U.S. Notice of Allowance dated Aug. 24, 2004 cited in U.S. Appl. No. 09/896,384.
U.S. Office Action dated Apr. 27, 2006 cited in U.S. Appl. No. 10/800,056.
U.S. Final Office Action dated Oct. 19, 2006 cited in U.S. Appl. No. 10/800,056.
U.S. Office Action dated Apr. 12, 2007 cited in U.S. Appl. No. 10/851,506.
U.S. Office Action dated Jun. 4, 2007 cited in U.S. Appl. No. 10/955,940.
U.S. Office Action dated Jul. 26, 2006 cited in U.S. Appl. No. 10/741,407.
U.S. Final Office Action dated Jan. 23, 2007 cited in U.S. Appl. No. 10/741,407.
U.S. Notice of Allowance dated Apr. 10, 2007 cited in U.S. Appl. No. 10/741,407.
U.S. Office Action dated Jan. 4, 2007 cited in U.S. Appl. No. 10/607,020.
U.S. Office Action dated Jun. 14, 2007 cited in U.S. Appl. No. 10/836,154.
U.S. Office Action dated Jun. 21, 2007 cited in U.S. Appl. No. 10/955,928.
U.S. Notice of Allowance dated Jul. 5, 2007 cited in U.S. Appl. No. 10/607,020.
U.S. Office Action dated Jul. 11, 2007 cited in U.S. Appl. No. 10/955,941.
U.S. Office Action dated Jul. 11, 2007 cited in U.S. Appl. No. 10/955,942.
Ohmori, Yasuo et al., "Eigyo Mind—A Sales Support Tool," PFU Tech. Rev., vol. 10, No. 1, pp. 32-38, PFU Limited, May 1, 1999.
Mexican Office Action dated May 26, 2011 cited in Appln. No. MX/a/2009/004151.
Korean Notice of Preliminary Rejection dated Jul. 22, 2011 cited in Appln No. 10-2005-0058160.
Japanese Notice of Rejection dated Aug. 12, 2011 cited in Appln. No. 2005-184990.
Korean Preliminary Rejection dated Aug. 23, 2011 cited in Appln. No. 10-2005-0067236.
Korean Preliminary Rejection dated Aug. 23, 2011 cited in Appln. No. 10-2005-0067411.
Chinese Office Action dated Aug. 26, 2011 cited in Appln No. 200980112454.5.
Korean Preliminary Rejection dated Aug. 29, 2011 cited in Appln. No. 10-2005-0066460.
Australian Office Action dated Aug. 31, 2011 cited in Appln. No. 2007255043.
3rd Official Notice, Mailing No. 134028, dated Sep. 16, 2001 cited in Appln. No. PH1707009.
4th Official Notice, Mailing No. 134052, dated Sep. 16, 2001 cited in Appln. No. PH1707009.
U.S. Official Action dated Sep. 13, 2011 in U.S. Appl. No. 12/372,386.
U.S. Official Action dated Sep. 14, 2011 in U.S. Appl. No. 12/163,758.
Mexican Office Action dated Oct. 3, 2011 cited in Appln. No. MX/a/2008/014849.
U.S. Official Action dated Oct. 25, 2011 in U.S. Appl. No. 12/144,642.
U.S. Official Action dated Nov. 2, 2011 cited in U.S. Appl. No. 10/836,154.
PCT Written Opinion and Search Report dated Sep. 2, 2010 cited in International Application No. PCT/US2010/021888.
Malaysian Substantive Examination Adverse Report dated Sep. 30, 2010 cited in Appln No. PI 20052959.
Australian Office Action dated Oct. 21, 2010 cited in Appln No. 2006284908.
Chinese Second Office Action dated Oct. 29, 2010 cited in Appln No. 200680030421.2.
U.S. Appl. No. 12/954,952, filed Sep. 29, 2010 entitled "Gallery User Interface Controls".
Bellavista et al., "A Mobile Infrastructure for Terminal, User, and Resource Mobility", Network Operations and Management Symposium, NOMS 2000, pp. 877-890, IEEE/IFIP.
"Microsoft Office Professional Plus 2007", © 2006, Microsoft Corporation; 66 pgs.
U.S. Official Action dated Nov. 9, 2010 in U.S. Appl. No. 10/607,020.
U.S. Official Action dated Nov. 22, 2010 in U.S. Appl. No. 11/782,059.
U.S. Official Action dated Nov. 26, 2010 in U.S. Appl. No. 12/753,923.

Dr. Dobb's Journal; "Windows 95 Common Controls"; May 1, 1995; 12 pgs.
Mexican Office Action Summary, dated Sep. 22, 2011 cited in Appln. No. MX/a/2008/003342.
Japanese Notice of Rejection dated Nov. 4, 2011 cited in Appln No. 2008-513476.
European Search Report dated Dec. 6, 2011 cited in Appln No. 06803424.8.
Japanese Notice of Rejection dated Dec. 16, 2011 cited in Appln No. 2008-529218.
U.S. Official Action dated Jan. 12, 2012 cited in U.S. Appl. No. 11/782,059.
U.S. Official Action dated Jan. 25, 2012 in U.S. Appl. No. 12/059,644.
Taiwan Office Action dated Feb. 8, 2012 cited in Appln No. 94123640, with Eng Lang Summary.
Taiwan Search Report dated Mar. 14, 2012 cited in Appln No. 094123420.
Chilean Office Action dated Mar. 29, 2012 cited in Appln No. 1560-2010, w/English Language Summary.
Chilean Office Action dated Mar. 29, 2012 cited in Appln No. 1559-2010, w/English Language Summary.
India First Examination Report dated Mar. 30, 2012 cited in Appln No. 1817/DEL/2005.
Japanese Notice of Allowance dated Apr. 11, 2012 cited in Appln No. 2008-530229.
U.S. Official Action dated Feb. 27, 2012 in U.S. Appl. No. 12/372,386.
U.S. Official Action dated Mar. 14, 2012 in U.S. Appl. No. 12/142,927.
U.S. Official Action dated Apr. 5, 2012 in U.S. Appl. No. 12/163,758.
U.S. Official Action dated Apr. 19, 2012 in U.S. Appl. No. 13/102,633.
U.S. Official Action dated Apr. 26, 2012 in U.S. Appl. No. 11/782,059.
Malaysian Substantive Examination Adverse Report dated Jan. 31, 2012 cited in Appln No. PI 20053258.
Malaysian Substantive Examination Adverse Report dated Jan. 31, 2012 cited in Appln No. PI 20053259.
European Search Report dated Feb. 10, 2012 cited in Appln No. 05107153.8.
European Search Report dated Feb. 15, 2012 cited in Appln No. 05107157.9.
European Search Report dated Feb. 28, 2012 cited in Appln No. 05107184.3.
Chinese Office Action dated Feb. 29, 2012 cited in Appln No. 200980124664.9.
Chinese Decision on Rejection dated Mar. 7, 2012 cited in Appln No. 200780020312.7.
Chinese Second Office Action dated Mar. 9, 2012 cited in Appln No. 200980124383.0.
Japanese Notice of Final Rejection dated Mar. 9, 2012 cited in Appln No. 2008-513476.
European Search Report dated Mar. 16, 2012 cited in Appln No. 05107186.6.
Taiwan Notice of Allowance dated Mar. 29, 2012 cited in Appln No. 10120306600.
Douglas et al., "Dynamic Popup Menu Titles"; IP.Com Journal, IP.COM Inc., West Henrietta, NY, Aug. 1, 1992, 2 pgs. (cited in Feb. 28, 2012 Search Report).
Haden et al.; "Scrollable Popup Menu with Selection Tracking Display of Graphical Objects"; IP.Com Journal, IP.COM Inc., West Henrietta, NY, Aug. 1, 1994, 6 pgs. (cited in Feb. 28, 2012 Search Report).
"Index Card Metaphor for Multiple Property Sheets Associated with A Given Object"; IBM Technical Disclosure Bulletin, International Business Machines Corp., vol. 33, No. 3A, Aug. 1, 1990, 2 pgs. (cited in Feb. 15, 2012 Search Report).
"Menu Selection Method for Related Attributes"; IBM Technical Disclosure Bulletin, International Business Machines Corp., vol. 33, No. 6B, Nov. 1990, 3 pgs. (cited in Feb. 15, 2012 Search Report).
U.S. Appl. No. 13/437,031, filed Apr. 2, 2012 entitled "Automatic Grouping of Electronic Mail".
U.S. Appl. No. 13/427,939, filed Mar. 23, 2012 entitled "An Improved User Interface for Displaying a Gallery of Formatting Options Applicable to a Selected Object".
European Communication dated Jun. 23, 2008 cited in European Application No. 04102463.9-2211/1517239.
U.S. Appl. No. 13/464,572 filed May 4, 2012 entitled "Accessing an Out-Space User Interface for a Document Editor Program".
Changing a Graph Type: Ultimate Illustration of Excel 2002 for Windows XP, General Book, X-media Corp., Aug. 31, 2002, p. 224 (cited in May 11, 2012 JP NOR).
Russel et al., (hereinafter "Russel"); "Special Edition Using Microsoft® Office Outlook® 2003"; Que publishing on Sep. 25, 2003, 71 pgs. (cited in Jun. 6, 2012 OA).
Chinese Fourth Office Action dated Apr. 27, 2012 cited in Appln No. 200680018095.3.
Japanese Notice of Rejection dated May 11, 2012 cited in Appln No. 2009-513223.
Mexican Office Action dated Jun. 6, 2012 cited in Appln No. MX/a/2008/014849.
U.S. Official Action dated May 8, 2012 in U.S. Appl. No. 12/144,642.
U.S. Official Action dated Jun. 6, 2012 in U.S. Appl. No. 12/777,287.
U.S. Official Action dated Jun. 3, 2010 in U.S. Appl. No. 12/028,797.
U.S. Official Acton dated Jun. 22, 2010 in U.S. Appl. No. 11/430,562.
U.S. Official Action dated Jun. 23, 2010 in U.S. Appl. No. 10/955,940.
U.S. Official Action dated Jul. 1, 2010 in U.S. Appl. No. 11/782,059.
Screen Shot of MS_Office_2003; (Microsoft Corporation, Microsoft Office Professional Edition 2003; 6 pages).
Israeli Office Action dated May 3, 2012 cited in Appln No. 169718.
Taiwan Office Action dated May 14, 2012 cited in Appln No. 94122180, with Eng Lang Summary.
Chinese Second Office Action dated Jun. 18, 2012 in Appln No. 200910148820.4.
U.S. Official Action dated Jun. 19, 2012 in U.S. Appl. No. 12/769,787.

* cited by examiner

COMMAND USER INTERFACE FOR DISPLAYING SELECTABLE SOFTWARE FUNCTIONALITY CONTROLS

CROSS-REFERENCE TO RELATED APPLICATIONS

The present application claims priority to U.S. Provisional Application No. 60/601,815, filed Aug. 16, 2004, entitled "Improved User Interfaces for Computer Software Applications."

FIELD OF THE INVENTION

The present invention generally relates to software application user interfaces. More particularly, the present invention relates to a command user interface for displaying selectable software functionality controls.

BACKGROUND OF THE INVENTION

With the advent of the computer age, computer and software users have grown accustomed to user-friendly software applications that help them write, calculate, organize, prepare presentations, send and receive electronic mail, make music, and the like. For example, modern electronic word processing applications allow users to prepare a variety of useful documents. Modern spreadsheet applications allow users to enter, manipulate, and organize data. Modern electronic slide presentation applications allow users to create a variety of slide presentations containing text, pictures, data or other useful objects.

To assist users to locate and utilize functionality of a given software application, a user interface containing a plurality of generic functionality controls is typically provided along an upper, lower or side edge of a displayed workspace in which the user may enter, copy, manipulate and format text or data. Such functionality controls often include selectable buttons with such names as "file," "edit," "view," "insert," "format," and the like. Typically, selection of one of these top-level functionality buttons, for example "format," causes a drop-down menu to be deployed to expose one or more selectable functionality controls associated with the top-level functionality, for example "font" under a top-level functionality of "format."

After a user selects a desired functionality control, or if the user moves the mouse cursor to a different location, the drop-down menu typically disappears. If the user determines that functionality of the first drop-down menu was the desired functionality, the user must remember which top-level functionality was selected, reselect that functionality and then find the desired functionality control all over again. Accordingly, in order to use the functionality of a given software application, the user must know the desired functionality is available under one of the selectable buttons, or the user must select different top-level functionalities until the desired specific functionality is located. Such a method of searching for desired functionality is cumbersome and time-consuming, particularly for less experienced users, and when new functionality is added by developers of the software application, the new functionality may never be utilized unless the user is somehow educated as to its existence.

Accordingly, there is a need in the art for an improved functionality command user interface for displaying selectable software functionality controls and for presenting logical groupings of particular functionality controls associated with a selected top-level functionality. It is with respect to these and other considerations that the present invention has been made.

SUMMARY OF THE INVENTION

Embodiments of the present invention solve the above and other problems by providing an improved user interface for displaying selectable software functionality controls and for presenting logical groupings of particular functionality controls associated with a selected top-level functionality. Generally, aspects of the present invention provide for organization of the functionality of a given software application into task-based modes. The modes are associated with tabs in a ribbon-shaped user interface, and the tabs are labeled with descriptive text associated with different functionality modes or tasks. Underneath a row of top-level functionality tabs, functionalities associated with a given top-level functionality tab are presented in logical groupings. Selection of a particular tab switches modes of the user interface to present controls for functionalities associated with the selected tab.

According to an aspect of the invention, methods and systems for providing functionality from a software application via an improved user interface are provided. A plurality of functionalities available from one or more software applications is organized according to one or more tasks that may be performed with the software application. A user interface tab for each of the one or more tasks is provided in the user interface. Upon receiving an indication of a selection of a given user interface tab, one or more selectable functionality controls are provided in the user interface for selecting one or more functionalities organized under a given task associated with the selected user interface tab.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

DETAILED DESCRIPTION

As briefly described above, embodiments of the present invention are directed to an improved user interface for displaying selectable software functionality controls associated with task-based functionality and for presenting logical groupings of particular functionality associated with a selected task-based functionality. As will be described in detail below, when one task-based functionality tab is selected from the user interface of the present invention, selectable functionality controls provided by the associated software application for performing aspects of a task related to the selected task-based functionality tab are presented in a ribbon-shaped user interface above a workspace in which the user is entering or editing a document or object. Upon selection of a different task-based functionality tab, the presentation of functionality controls associated with the first task is removed, and selectable functionality controls associated with the second selected task-based functionality tab are presented in the user interface. The selectable functionality controls presented in the user interface are grouped into logical groupings for more efficient utilization.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

Figure 1:
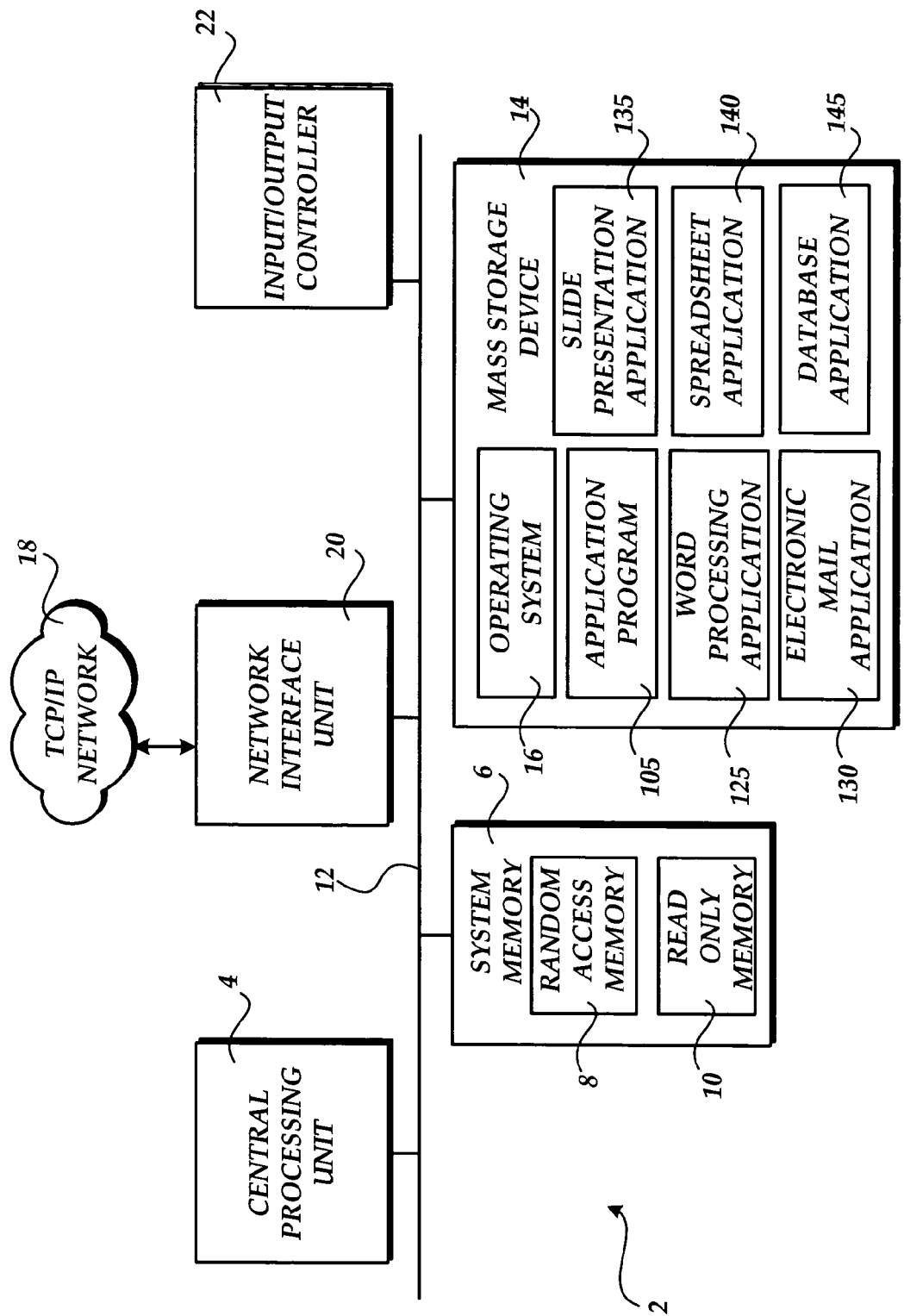
FIG. 1 is a block diagram showing the architecture of a personal computer that provides an illustrative operating environment for embodiments of the present invention.

Referring now to the drawings, in which like numerals represent like elements through the several figures, aspects of the present invention and the exemplary operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for a personal computer 2 for practicing the various embodiments of the invention will be described. The computer architecture shown in FIG. 1 illustrates a conventional personal computer, including a central processing unit 4 ("CPU"), a system memory 6, including a random access memory 8 ("RAM") and a read-only memory ("ROM") 10, and a system bus 12 that couples the memory to the CPU 4. A basic input/output system containing the basic routines that help to transfer information between elements within the computer, such as during startup, is stored in the ROM 10. The personal computer 2 further includes a mass storage device 14 for storing an operating system 16, application programs, such as the application program 205, and data.

The mass storage device 14 is connected to the CPU 4 through a mass storage controller (not shown) connected to the bus 12. The mass storage device 14 and its associated computer-readable media, provide non-volatile storage for the personal computer 2. Although the description of computer-readable media contained herein refers to a mass storage device, such as a hard disk or CD-ROM drive, it should be appreciated by those skilled in the art that computer-readable media can be any available media that can be accessed by the personal computer 2.

By way of example, and not limitation, computer-readable media may comprise computer storage media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the personal computer 2 may operate in a networked environment using logical connections to remote computers through a TCP/IP network 18, such as the Internet. The personal computer 2 may connect to the TCP/IP network 18 through a network interface unit 20 connected to the bus 12. It should be appreciated that the network interface unit 20 may also be utilized to connect to other types of networks and remote computer systems. The personal computer 2 may also include an input/output controller 22 for receiving and processing input from a number of devices, including a keyboard or mouse (not shown). Similarly, an input/output controller 22 may provide output to a display screen, a printer, or other type of output device.

As mentioned briefly above, a number of program modules and data files may be stored in the mass storage device 14 and RAM 8 of the personal computer 2, including an operating system 16 suitable for controlling the operation of a networked personal computer, such as the WINDOWS operating systems from Microsoft Corporation of Redmond, Wash. The mass storage device 14 and RAM 8 may also store one or more application programs. In particular, the mass storage device 14 and RAM 8 may store an application program 105 for providing a variety of functionalities to a user. For instance, the application program 105 may comprise many types of programs such as a word processing application, a spreadsheet application, a desktop publishing application, and the like. According to an embodiment of the present invention, the application program 105 comprises a multiple functionality software application for providing word processing functionality, slide presentation functionality, spreadsheet functionality, database functionality and the like. Some of the individual program modules comprising the multiple functionality application 105 include a word processing application 125, a slide presentation application 135, a spreadsheet application 140 and a database application 145. An example of such a multiple functionality application 105 is OFFICE manufactured by Microsoft Corporation. Other software applications illustrated in FIG. 1 include an electronic mail application 130.

Figure 2:
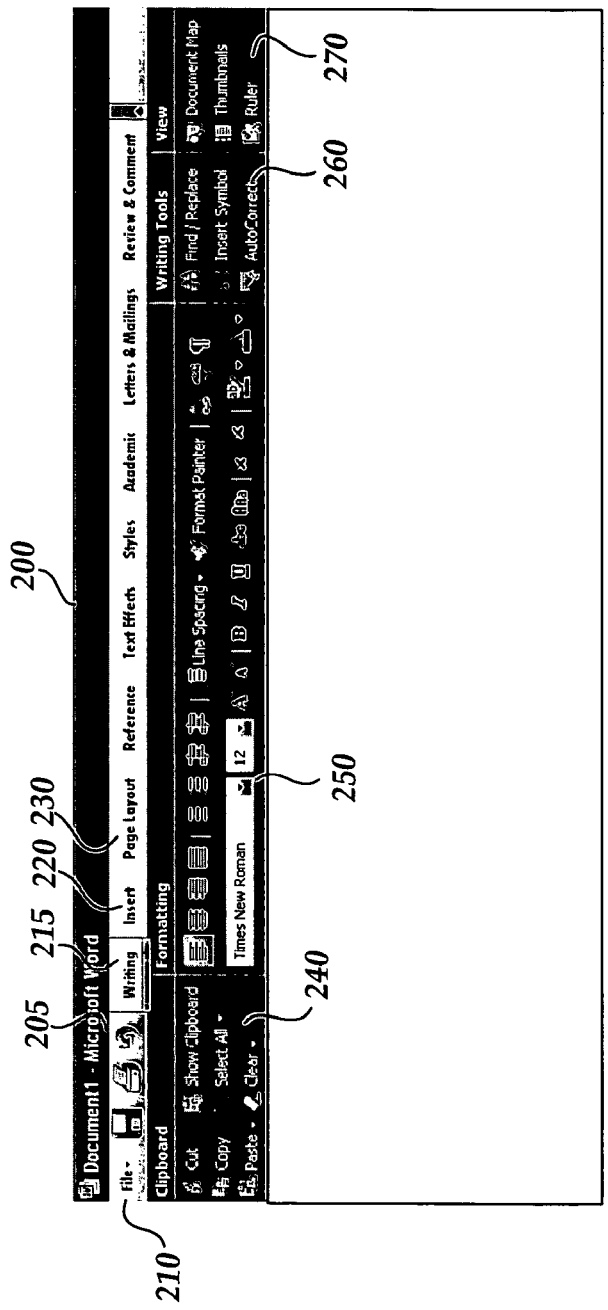
FIG. 2 is an illustration of a computer screen display showing a ribbon-shaped user interface for displaying task-based top-level functionality tabs and for displaying a plurality of functionalities available under a selected top-level functionality tab.

FIG. 2 is an illustration of a computer screen display showing a ribbon-shaped user interface for displaying task-based top-level functionality tabs and for displaying a plurality of functionalities available under a selected top-level functionality tab. As briefly described above, the improved user interface of the present invention includes a ribbon-shaped user interface for displaying selectable controls associated with task-based functionality available under a given software application, such as the software application 105 illustrated in FIG. 1. A first section 210 of the user interface 200 includes generic selectable controls for functionality not associated with a particular task, such as word processing versus spreadsheet data analysis. For example, the section 210 includes selectable controls for general file commands such as "file open," "file save" and "print." According to one embodiment of the present invention, the selectable controls included in the first section 210 are controls that may be utilized by a variety of software applications comprising a multiple functionality application 105. That is, the selectable controls included in the first section 210 may be controls that are generally found and used across a number of different software applications.

Selectable controls included in the first section 210 may be utilized for all such applications comprising such a multiple functionality application, but other selectable controls presented in the user interface 200 described below, may be tailored to particular tasks which may be performed by particular software applications comprising the multiple functionality application. On the other hand, it should be appreciated that the user interface 200 described herein may be utilized for a single software application such as a word processing application 125, a slide presentation application 135, a spreadsheet application 140, a database application 145, or any other software application which may utilize a user interface for allowing users to apply functionality of the associated application.

Referring still to FIG. 2, adjacent to the first section 210 of the user interface 200 is a task-based tab section. The tab section includes selectable tabs associated with task-based functionality provided by a given software application. For purposes of example, the task-based tabs illustrated in FIG. 2 are associated with tasks that may be performed using a word processing application 125. For example, a "Writing" tab 215 is associated with functionality that may be utilized for performing writing tasks. An "Insert" tab 220 is associated with functionality associated with performing insert operations or tasks. A "Page Layout" tab 230 is associated with functionality provided by the associated application for performing or editing page layout attributes of a given document.

As should be appreciated, many other task-based tabs or selectable controls may be added to the tab section of the user interface for calling functionality associated with other tasks. For example, task tabs may be added for text effects, document styles, review and comment, and the like. And, as described above, the user interface 200 may be utilized for a variety of different software applications. For example, if the user interface 200 is utilized for a slide presentation application, tabs contained in the tab section may include such tabs as "Create Slides," "Insert," "Format," "Drawing," "Effects," and the like associated with a variety of tasks that may be performed by a slide presentation application. Similarly, tabs that may be utilized in the tab section of the user interface 200 for a spreadsheet application 140 may include such tabs as "Data" or "Data Entry," "Lists," "Pivot Tables," "Analysis," "Formulas," "Pages and Printing," and the like associated with tasks that may be performed using a spreadsheet application.

Immediately beneath the generic controls section 210 and the task-based tab section is a selectable functionality control section for displaying selectable functionality controls associated with a selected tab 215, 220, 230 from the task-based tab section. According to embodiments of the present invention, when a particular tab, such as the "Writing" tab 215 is selected, selectable functionality available from the associated software application for performing the selected task, for example a writing task, is displayed in logical groupings. For example, referring to FIG. 2, a first logical grouping 240 is displayed under a heading "Clipboard." According to embodiments of the present invention, the clipboard section 240 includes selectable functionality controls logically grouped together and associated with clipboard actions underneath the general task of writing. For example, the clipboard section 240 may include such selectable controls as a cut control, a copy control, a paste control, a select all control, etc. Adjacent to the clipboard section 240, a second logical grouping 250 is presented under the heading "Formatting." Selectable controls presented in the "Formatting" section 250 may include such selectable controls as text justification, text type, font size, line spacing, boldface, italics, underline, etc. Accordingly, functionalities associated with formatting operations are logically grouped together underneath the overall task of "Writing." A third logical grouping 260 is presented under the heading "Writing Tools." The writing tools section 260 includes such writing tools as find/replace, autocorrect, etc.

Figure 3:
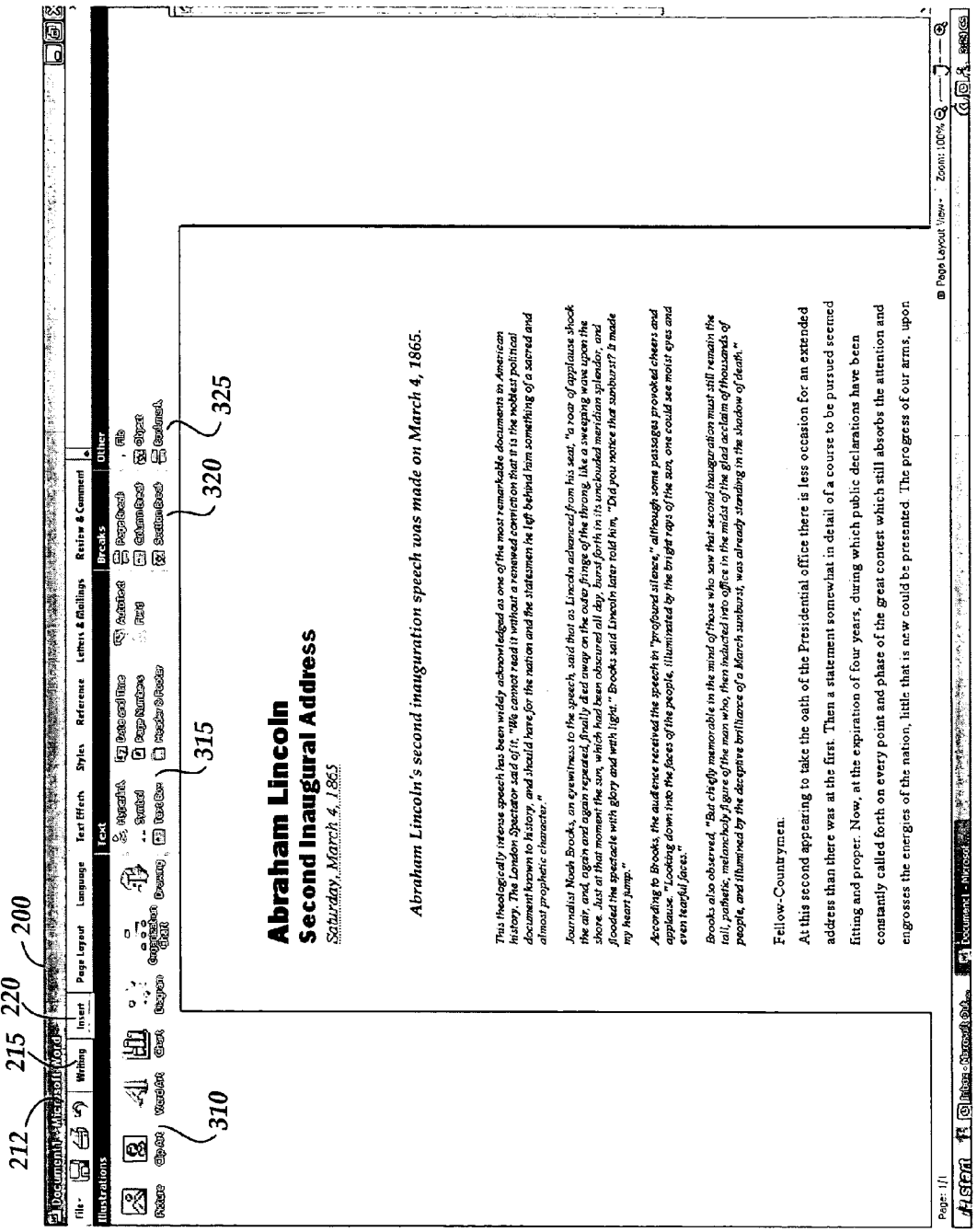
FIG. 3 illustrates a computer screen display showing the user interface illustrated in FIG. 2 whereby a different set of functionalities is presented associated with a different top-level functionality tab.

As described below with reference to FIGS. 3 and 4, upon selection of a different task-based tab from the tab section, a different set of selectable functionality controls in different logical groupings is presented in the user interface 200 associated with the selected task-based tab. As illustrated in FIG. 3, the "Insert" task tab 220 is selected, and the selectable functionality controls presented in the user interface 200 are changed from those illustrated in FIG. 2 to include selectable functionality controls associated with the insert task. For example, a first selectable functionality control section 310 is illustrated under a heading "Illustrations." The illustrations section 310 includes selectable controls for allowing a user to insert into the application workspace a variety of illustrations such as pictures, clip art, word art, charts, diagrams, organization charts, drawings and the like. A second selectable functionality control section 315 is provided under the heading "Text" and provides selectable functionality controls for inserting text-type objects or data into the user's workspace. For example, controls contained in the text section 315 include hyperlink, symbol, text box, date and time, page numbers, headers and footers, etc. A third selectable functionality control section 320 is presented under the heading "Breaks." This section includes selectable functionality controls for inserting breaks such as page breaks, column breaks, section breaks, etc.

Figure 4:
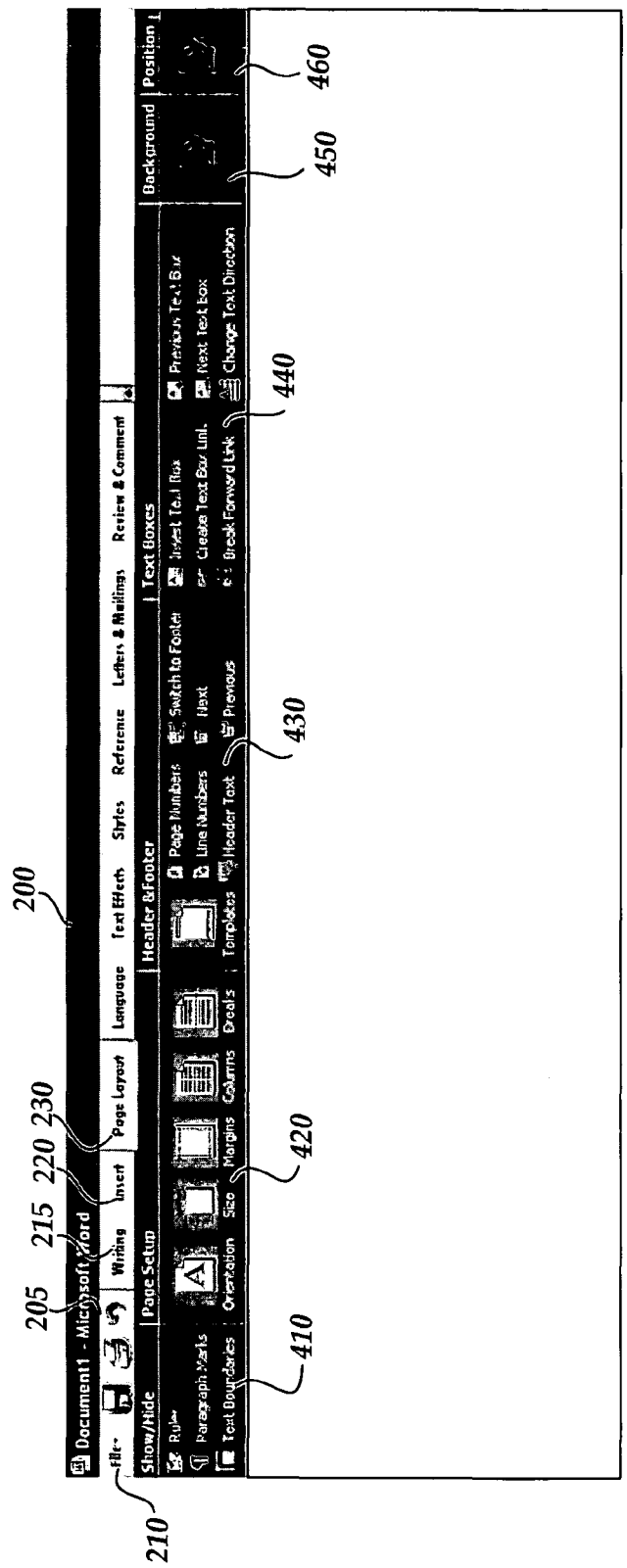
FIG. 4 illustrates a computer screen display showing the user interface illustrated in FIG. 2 whereby a different set of functionalities is presented associated with a different top-level functionality tab.

Referring to FIG. 4, the user interface 200 illustrated in FIGS. 2 and 3 is illustrated wherein the "Page Layout" tab 230 is selected. Upon selection of the "Page Layout" tab 230, selectable functionality controls associated with performing page layout tasks are presented to the user in logical groupings 410, 420, 430, 440, 450, 460. For example, a first logical grouping 410 is illustrated under the heading "Show/Hide" and includes selectable functionality controls associated with showing or hiding page layout information such as ruler information, paragraph markings, text boundaries, and the like. A second section 420 is grouped under a heading "Page Setup." The page setup section 420 includes selectable functionality controls for adjusting or editing a page's orientation, size, margins, column settings, page layout breaks, etc. A third section 430 is presented under a heading "Header & Footer." This section 430 includes selectable functionality controls for software application functionality related to inserting and editing header and footer information.

Along the right edge of the user interface 200 is included a "Background" section 450 and a "Position" section 460. According to the user interface illustrated in FIG. 4, these selectable functionality control sections are closed or collapsed. That is, the user interface 200, as illustrated in FIG. 4, has insufficient space for displaying individual selectable functionality controls under each of these two sections. Accordingly, these two sections are closed from view. As should be appreciated, depending upon the screen size available for displaying the user interface 200 or depending upon the display settings utilized by a given user of the user interface 200, varying amounts of space will be available for displaying the task-based tabs and associated selectable functionality controls. Accordingly, when insufficient space is available in the user interface 200 for displaying all logical groupings associated with a given task-based tab, a determination may be made at application run time as to any logical groupings that must be collapsed or closed until the associated task-based tab is selected. Similarly, if the user manually reduces the size of the user interface 200, a determination is made as to the available space for displaying selectable functionality control sections, and certain selectable functionality control sections are collapsed as required. As should be appreciated, a determination may be made as to the order of collapsing selectable functionality control sections such that a criteria, such as "most used" or "most recently used" may be used for determining which selectable functionality control sections are displayed and which sections are collapsed as the available space in the user interface is decreased.

According to an alternate embodiment, if the user interface 200 lacks sufficient space to display all logical groupings of functionality controls associated with a given task-based tab, the size of the display of individual logical groupings is reduced to allow space for the display of all associated logical groupings. According to one aspect of this embodiment, different sizes of groupings displays, for example small, medium and large, may be defined. At display time, a determination may be made as to the available space. At a starting point, the largest size for each applicable logical grouping display is presented. As required, the display size is reduced (i.e., large to medium to small) for each logical grouping until each grouping fits in the available space. In addition, for smaller logical grouping display layouts, text labels may be shortened or eliminated, and the layout of individual selectable controls contained in given groupings may be rearranged to allow for more efficient use of space.

According to embodiments of the present invention, selection of a closed or collapsed selectable functionality control section, such as the sections 450, 460 causes a rearrangement of the user interface 200 for presenting the selectable functionality controls associated with the selected section. That is, as should be appreciated, one or more of the other presently fully displayed sections may be collapsed in order to make room for the selectable functionality controls of a previously closed or collapsed section. Alternatively, all selectable functionality controls presently displayed in the user interface 200 may remain displayed as is, and selectable functionality controls contained under a selected closed or collapsed section may be displayed in a drop-down display that is presented vertically below the selected closed or collapsed section or that is displayed horizontally underneath the user interface 200. Alternatively, the selectable functionality controls associated with a selected closed or collapsed section may be displayed in a pop-up menu or text box.

According to embodiments of the present invention, customization of the displayed selectable functionality control sections may be performed. That is, the selectable functionality control sections under a given selected task tab may be reordered according to the particular needs of a given user, and certain sections may be hidden from view if the functionality associated with those sections are never used by a given user. Or, a presently displayed selectable functionality control section may be manually collapsed in order to make space in the user interface 200 for the display of a selectable functionality control section that is presently closed or collapsed due to insufficient space in the user interface 200.

According to embodiments of the present invention, a user may browse through available selectable functionality controls using a mouse-over action. During the mouse-over action, the displayed functionality is dynamically changed relative to a tab or functionality control on which the mouse cursor is focused at a given time. For example, referring to FIGS. 2, 3, 4, if a user clicks and holds the mouse cursor over the "Writing" tab, the selectable functionality controls sections and associated controls are displayed. If the user does not see desired functionality controls, the user may mouse-over to a second tab, for example, the "Insert" tab 220, and the selectable functionality controls groupings associated with the "Insert" tab are dynamically displayed as illustrated in FIG. 3. If the user sees a desired control in one of the selectable functionality controls sections or groupings under the "Insert" tab, for example, the user may select the desired control for application to a selected document or object. After the user selects the desired control or command, the user interface 200 reverts back to the display that was presented to the user before the user started the mouse-over action. That is, a display of the selectable functionality control sections of the finally selected control does not remain displayed in the user interface 200. The user interface 200 returns to the original display prior to the mouse-over action.

Figure 5:
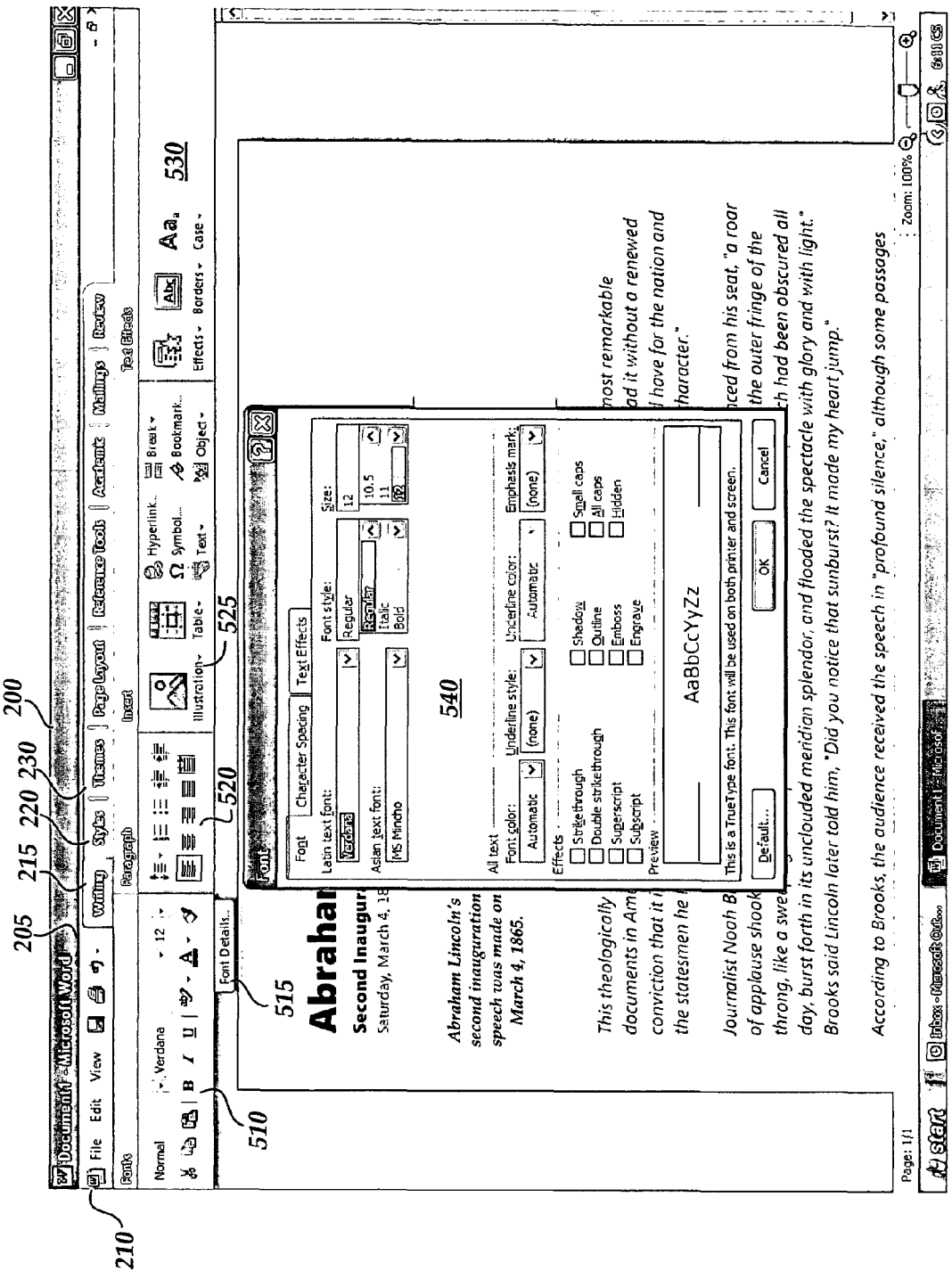
FIG. 5 illustrates a computer screen display showing a pop-up user interface for providing detailed functionality associated with a selected subset of functionalities presented in the ribbon-shaped user interface illustrated in FIGS. 2 through 4.

As should be appreciated by those skilled in the art, because of space limitations in the sections of the user interface 200 containing logical groupings of selectable functionality controls, not all functionality that may be desired or utilized by a given user of the software application may be accessible by selecting one of the controls presented in a given section. Many additional functionalities may be available that may be associated with, or otherwise related to a given selectable functionality control section under a selected task-based tab. Referring now to FIG. 5, if a user requires the use of additional functionality not presented in a given selectable functionality control section, or if the user desires detailed information regarding the attributes of a document or object according to the application of functionality presented in a given selectable functionality control section, a dialog 540 may be launched to provide additional selectable functionality controls, or to provide detailed information regarding the application of functionality to a document or object.

For example, as illustrated in FIG. 5, selection of the "Fonts" selectable functionality control section 510 causes the deployment of a "Font Details" tab 515 below the section 510. Selection of the "Font Details" tab 515 causes deployment of the "Font" dialog 540 to provide the user detailed information as to the application of particular functionality, for example fonts, to a selected document or object and provides the user additional selectable functionality not presented to the user in the selectable functionality control section 510. As should be appreciated, the "Font Details" tab 515 may be deployed each time the user focuses a mouse cursor in any portion of the section 510 to alert the user that the user may selectively launch the dialogue 540 if desired. Alternatively, other mechanisms may be used for deploying the tab 515 such as selecting the section heading, for example "Fonts" for the section 510, or selecting any area within the section 510 not associated with a particular control, or right clicking the "Fonts" section 510.

Figure 6:
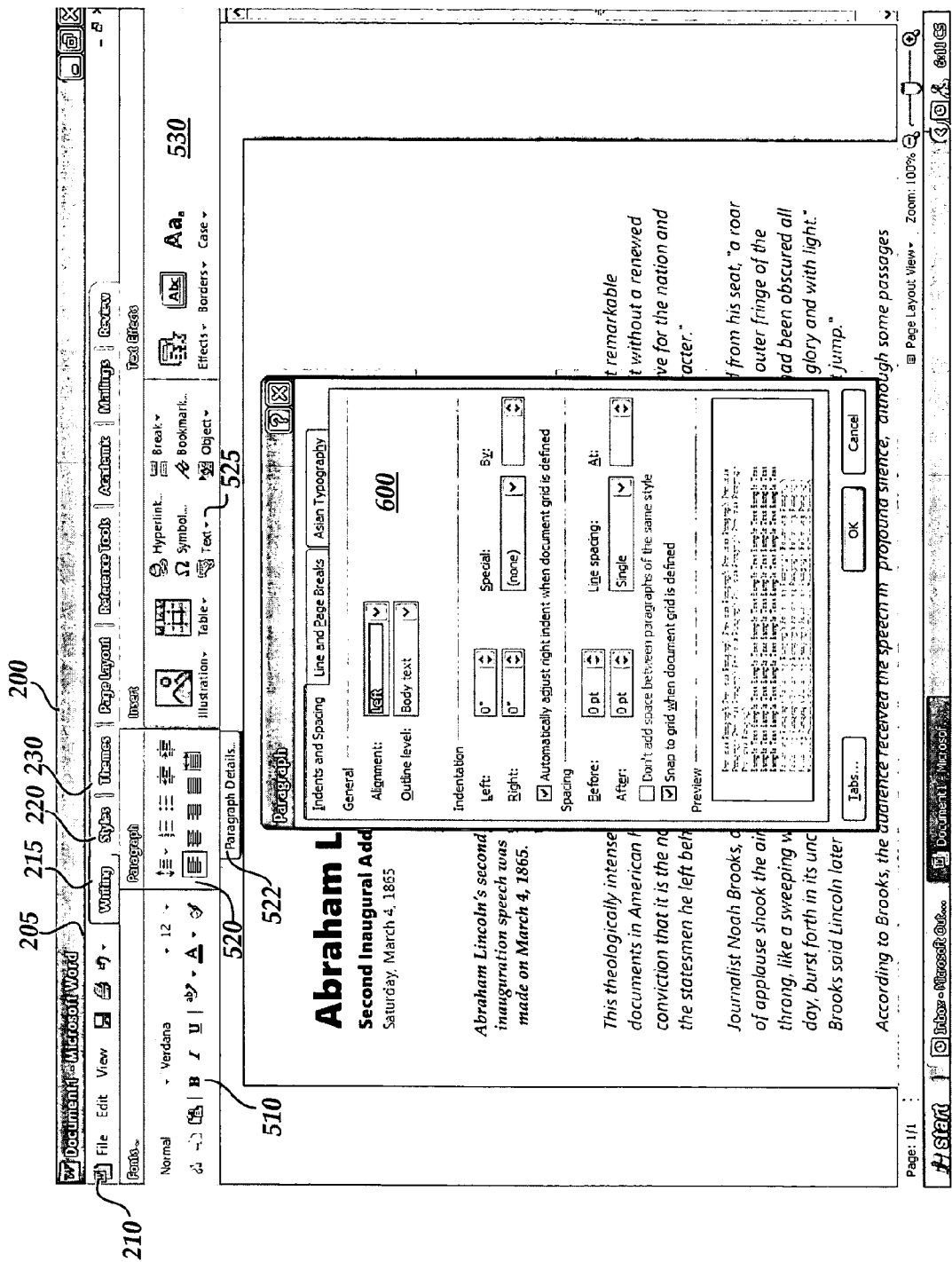
FIG. 6 illustrates a computer screen display showing a pop-up user interface for providing detailed functionality associated with a selected subset of functionalities presented in the ribbon-shaped user interface illustrated in FIGS. 2 through 4.

Referring to FIG. 6, a second launched dialog 600 is illustrated which is associated with a second selectable functionality control section 520 of the user interface 200. As described with respect to FIG. 5, a tab 522 is deployed underneath the selectable functionality control section 520 for launching the dialog 600 for providing a user additional functionality or additional information regarding attributes applied to a selected document or object under the associated selectable functionality control section 520, for example the "Paragraph" section. As should be appreciated, dialog such as the dialogs 540 and 600 illustrated in FIGS. 5 and 6, may be launched for any selectable functionality control section displayed in the user interface 200 where additional functionality or details may be provided to a desiring user.

Figure 7:
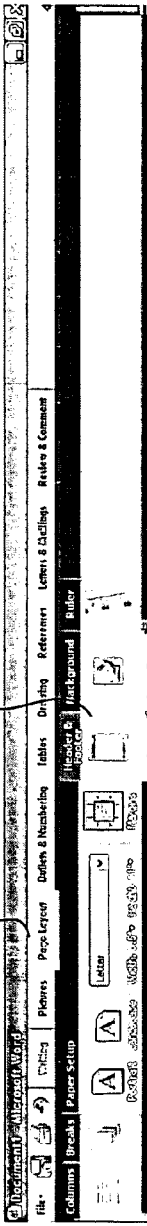
FIG. 7 illustrates a computer screen display showing a drop-down menu of functionalities associated with a selected functionality presented in the ribbon-shaped user interface illustrated in FIGS. 2 through 4.

Referring now to FIG. 7, a drop-down menu of selectable functionality controls is illustrated beneath a selected control 710 in the main body of the user interface 200. In some cases, insufficient space may be available for all selectable functionality controls to be displayed into a logical grouping in the user interface 200 upon selection of an associated functionality tab 230. According to embodiments of the invention, in such a case, a control such as the "Header & Footer" control 710 may be populated into the user interface 200. Selection of the control 710 causes deployment of the drop-down menu 730 for displaying selectable functionality controls associated with the control 710.

Figure 8:
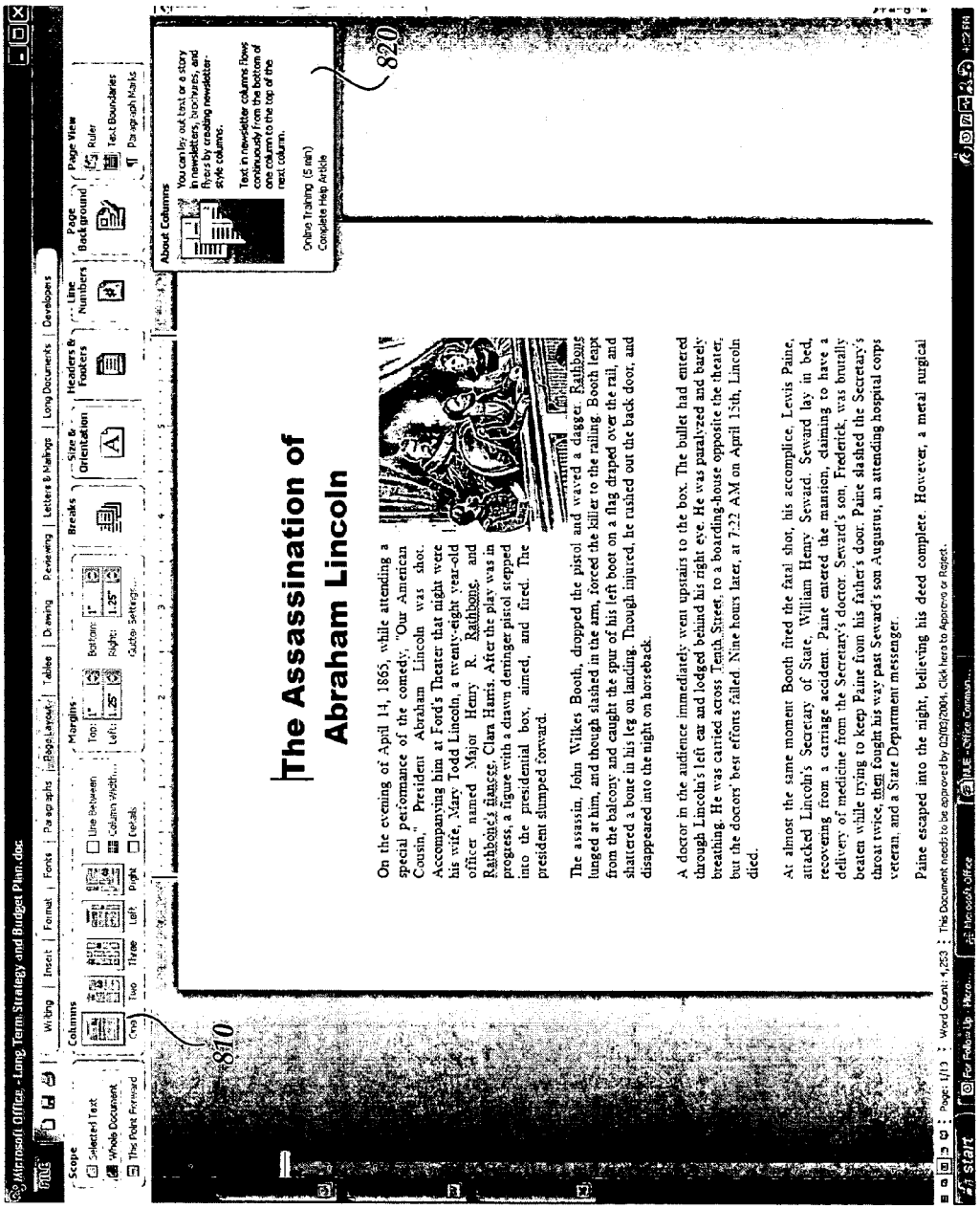
FIG. 8 illustrates a computer screen display showing the presentation of a tool tip dialog box for providing helpful information about a selected or focused-on functionality control.

Referring now to FIG. 8, a variety of tool tips may be displayed to the user to provide helpful information or tutorials regarding different functionality of an associated application. For example, as illustrated in FIG. 8, a tool tips pop-up dialog 820 is displayed for providing helpful information regarding the functionality available under a "Columns" section 810. As shown in the pop-up dialog 820, helpful information is provided regarding application of columns formatting and structure to a document. In addition, online training and other helpful information may be provided through the deployed pop-up dialog. As should be understood, helpful tool tips, such as the tool tip 820, may be provided for any functionality grouping displayed in the user interface 200, or tool tips 820 may be provided for individual functionality controls. Deployment of tool tips 820 may be performed in response to a variety of different user actions. For example, placing a mouse cursor on a selected control or grouping of controls followed by selection of a function key, such as the F1 key may deploy the pop-up dialog. For another example, a right-click of a mouse device on a given grouping of functionality controls may deploy the pop-up dialog. Other mechanisms including mouse-over actions or automatic deployment after a set amount of time of focusing a mouse cursor in a given section of the user interface 200 may be utilized for deploying the tool tips pop-up dialog.

As described herein, an improved user interface is provided for exposing task-based top-level functionality tabs for displaying logical groupings of selectable software functionality controls associated with given task-based functionality tabs. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method for providing functionality from a software application by displaying an improved user interface at a display device, the method comprising:
    organizing a plurality of software functionalities according to tasks to be performed by the software application, the tasks being identified textually by user interface tabs;
    upon receiving an indication of a selection of a first user interface tab, providing a plurality of selectable controls associated with a first task, each selectable control being presented by a graphic representation and a textual representation;
    grouping the plurality of selectable controls into logical groupings of the plurality of selectable controls, wherein each of the logical groupings combine a subset of functionalities associated with the selected first user interface tab;
    dynamically adjusting a layout of at least one of the logical groupings to accommodate the user interface, wherein dynamically adjusting the layout of the at least one logical grouping comprises reducing a size of the graphical representation of at least one selectable control within the logical grouping eliminating the textual representation of at least one selectable control associated with the at least one logical grouping, and preserving the graphical representation associated with the at least one selectable control associated with the at least one logical grouping;
    upon receiving an indication of a selection of a second user interface tab, providing in the user interface a plurality of additional selectable controls for selecting functionalities organized under a second task associated with the second user interface tab;
    after providing in the user interface the plurality of additional selectable controls for selecting functionalities organized under the second task, receiving an indication of a selection of one of the additional selectable controls organized under the second task;
    applying functionality associated with the selected additional selectable control to a selected object; and
    when the second user interface tab is not selected in the user interface, providing in the user interface the plurality of selectable controls organized under the first task associated with the selected first user interface tab.

2. The method of claim 1, further comprising upon receiving an indication of a selection of one of the selectable controls, applying functionality associated with the selected one of the selectable controls to a selected document object.

3. The method of claim 1, further comprising upon receiving an indication of a selection of the second user interface tab, providing the plurality of additional selectable controls for selecting functionalities organized under the second task associated with the selected second user interface tab.

4. The method of claim 1, further comprising upon receiving a selection of one of the logical groupings of selectable controls, providing a details tab for selectively deploying a second user interface for providing additional functionality controls associated with the selected logical grouping.

5. The method of claim 4, wherein providing the details tab for selectively deploying the second user interface comprises providing information identifying functionality, organized under the selected logical grouping, presently applied to a selected document object.

6. The method of claim 1, further comprising when the user interface lacks sufficient space for displaying the plurality of selectable controls of the at least one logical grouping, collapsing the at least one logical grouping into a single selectable control for accessing the plurality of selectable controls grouped under the at least one logical grouping.

7. The method of claim 6, further comprising upon receiving a selection of the single selectable control, providing a menu of the plurality of selectable controls grouped under the at least one logical grouping.

8. The method of claim 1, further comprising when the user interface lacks sufficient space for displaying the plurality of selectable controls of a given logical grouping, reducing the display size of each of the logical groupings until each of the logical groupings is displayed in the user interface.

9. The method of claim 8, further comprising rearranging a layout of individual selectable controls grouped in the given logical grouping for reducing the display size of the logical grouping.

10. The method of claim 9, further comprising amending a display of individual selectable controls grouped in the given logical grouping for reducing the display size of the logical grouping.

11. The method of claim 1, further comprising upon receiving a selection of one of the logical groupings of selectable controls, providing a tool tips dialog for providing information about software application functionalities associated with the selected logical grouping.

12. A computer readable device having a set of instructions which when executed performs a method for providing functionality from a software application via an improved user interface, the method executed by the set of instructions comprising:

organizing a plurality of software functionalities according to tasks to be performed by the software application, the tasks being identified textually by user interface tabs;

upon receiving an indication of a selection of a first user interface tab, providing a plurality of selectable controls associated with a first task, each selectable control being presented by a graphic representation and a textual representation;

grouping the plurality of selectable controls into logical groupings of the plurality of selectable controls, wherein each of the logical groupings combine a subset of functionalities associated with the selected first user interface tab;

upon detection of a variation in a display size of the user interface, rearranging a layout of the logical groupings, wherein rearranging the layout of at least one of the logical groupings comprises rearranging a layout of at least a portion of the selectable controls within the at least one logical grouping and reducing a size of at least a portion of the selectable controls within the at least one logical grouping and eliminating the textual representation associated with the at least one selectable control;

upon receiving an indication of a selection of a second user interface tab, providing in the user interface a plurality of additional selectable controls for selecting functionalities organized under a second task associated with the second user interface tab;

after providing in the user interface the plurality of additional selectable controls for selecting functionalities organized under the second task, receiving an indication of a selection of one of the additional selectable controls organized under the second task;

applying functionality associated with the selected additional selectable control to a selected object; and when the second user interface tab is not selected in the user interface, providing in the user interface the plurality of selectable controls organized under the first task associated with the selected first user interface tab.

13. The computer readable device of claim 12, further comprising upon receiving an indication of a selection of one of the selectable controls, applying functionality associated with the selected one of the selectable controls to a selected document object.

14. The computer readable device of claim 12, further comprising upon receiving an indication of a selection of the second user interface tab, providing the plurality of additional selectable controls for selecting functionalities organized under the second task associated with the selected second user interface tab.

15. The computer readable device of claim 12, further comprising upon receiving a selection of one of the logical groupings of selectable controls, providing a details tab for selectively deploying a second user interface for providing additional functionality controls associated with the selected logical grouping.

16. The computer readable device of claim 15, wherein providing the details tab includes providing the details tab for selectively deploying the second user interface for providing information identifying functionality organized under the selected logical grouping presently applied to a selected document object.

17. The computer readable device of claim 12, further comprising when the user interface lacks sufficient space for displaying selectable controls of the at least one logical grouping, collapsing the at least one logical grouping into a single selectable control for accessing the selectable controls grouped under the at least one logical grouping.

18. The computer readable medium of claim 17, further comprising upon receiving a selection of the single selectable control, providing a menu of the selectable controls grouped under the at least one logical grouping.

19. The computer readable medium of claim 12, further comprising when the user interface lacks sufficient space for displaying selectable controls of the at least one logical grouping, reducing the display size of each of the logical groupings until each of the at least one logical grouping is displayable in the user interface.

20. The computer readable device of claim 19, further comprising amending a display of individual selectable controls grouped in the given logical grouping for reducing the display size of the logical grouping.

21. The computer readable medium of claim 12, further comprising upon receiving a selection of one of the logical groupings of selectable controls, providing a tool tips dialog for providing information about software application functionalities associated with the selected logical grouping.

22. A computer readable storage device having a set of instructions which when executed performs a method for providing functionality from a software application via an improved user interface, the method executed by the set of instructions comprising:

providing a user interface tab that is identified textually for each of a plurality of tasks to be performed by the software application;

upon receiving an indication of a selection of a first user interface tab, providing selectable controls for selecting functionalities associated with a first task, each selectable control being presented by a graphic representation and a textual representation;

grouping the selectable controls into logical groupings of selectable controls, wherein each of the logical groupings combine a subset of functionalities associated with the selected first user interface tab;

upon a change in a display size of the user interface, reducing a display size of at least one of the logical groupings, wherein reducing the display size of the at least one logical grouping comprises reducing a size of the graphical representation of at least one selectable control within the at least one logical grouping and eliminating the textual representation associated with the at least one selectable control;

upon receiving an indication of a selection of a second user interface tab, providing in the user interface a plurality of additional selectable controls for selecting functionalities organized under a second task associated with the second user interface tab;

after providing in the user interface the plurality of additional selectable controls for selecting functionalities organized under the second task, receiving an indication of a selection of one of the additional selectable controls organized under the second task;

applying functionality associated with the selected additional selectable control to a selected object; and when the second user interface tab is not selected in the user interface, providing in the user interface the plurality of selectable controls organized under the first task associated with the selected first user interface tab.

23. A computer readable storage device of claim 22, further comprising upon receiving an indication of a selection of one of the selectable controls, applying functionality associated with the selected one of the selectable controls to a selected document object.

24. A computer readable storage device of claim 22, further comprising upon receiving an indication of a selection of a second user interface tab, providing in the user interface a plurality of additional selectable controls for selecting functionalities associated with a second task.

25. A computer readable storage device of claim 22, further comprising when the user interface lacks sufficient space for displaying selectable controls of the at least one logical grouping, collapsing the at least one logical grouping into a single selectable control for accessing the selectable controls grouped under the at least one logical grouping.

26. A computer readable storage device of claim 25, further comprising upon receiving a selection of the single selectable control, providing a menu of the selectable controls grouped under the at least one logical grouping.

27. A computer readable storage device of claim 22, further comprising when the user interface lacks sufficient space for displaying selectable controls of the at least one logical grouping, reducing the display size of each of the logical groupings until each of the at least one logical grouping is displayable in the user interface.

28. A computer readable storage device of claim 27, further comprising rearranging a layout of individual selectable controls grouped in the at least one logical grouping for reducing the display size of the logical grouping.

29. A computer readable storage device of claim 28, further comprising amending the display of individual selectable controls grouped in the at least one given logical grouping for reducing the display size of the at least one logical grouping.

30. The method of claim 1, further comprising dynamically adjusting the layout of the at least one of the logical groupings to accommodate a change in a size of the user interface.

31. A computer readable device of claim 12, further comprising collapsing, as a size of the user interface decreases, the logical groupings in an order that is based on at least one of the following: a set of most used selectable controls and a set of most recently used selectable controls associated with the logical groupings.

32. A computer readable storage device of claim 22, further comprising collapsing, as a size of the user interface decreases, the logical groupings in an order that is based on at least one of the following: a set of most used selectable controls and a set of most recently used selectable controls associated with the logical groupings.

33. The method of claim 1, further comprising dynamically adjusting the layout of the at least one logical grouping upon a decrease of a size of the user interface.

* * * * *